United States Patent
Kato et al.

[11] Patent Number: 5,914,929
[45] Date of Patent: Jun. 22, 1999

[54] OPTICAL DISK RECORDING/PLAYBACK DEVICE WITH MEANS TO RECOGNIZE, READ FROM AND RECORD TO MULTIPLE TYPES OF OPTICAL DISK TYPES

[75] Inventors: Seizo Kato; Kenji Torazawa, both of Ogaki; Kenji Nakao, Gifu; Shigeki Hori, Ogaki, all of Japan

[73] Assignee: Sanyo Electric Co., Ltd., Moriguchi, Japan

[21] Appl. No.: 08/999,802

[22] Filed: Aug. 11, 1997

Related U.S. Application Data

[63] Continuation of application No. 08/523,862, Sep. 6, 1995, abandoned.

[30] Foreign Application Priority Data

Sep. 7, 1994 [JP] Japan .................................. 6-213818
Sep. 7, 1994 [JP] Japan .................................. 6-213819
Sep. 7, 1994 [JP] Japan .................................. 6-213820

[51] Int. Cl.$^6$ .............................. G11B 33/02; G11B 3/90
[52] U.S. Cl. ......................... 369/75.2; 369/54; 369/270
[58] Field of Search ................................. 369/47, 54, 58, 369/75.2, 77.2, 271, 53, 76, 77.1, 184, 188, 190, 191, 192, 194, 258, 264, 270, 263

[56] References Cited

U.S. PATENT DOCUMENTS

| | | | |
|---|---|---|---|
| 4,853,915 | 8/1989 | Takasago et al. ................ | 369/58 X |
| 5,109,372 | 4/1992 | Caspers et al. .................. | 369/75.2 |
| 5,177,728 | 1/1993 | Otsubo et al. ................... | 369/58 X |
| 5,299,185 | 3/1994 | Sakurai et al. .................. | 369/75.2 |
| 5,315,570 | 5/1994 | Miura et al. .................... | 369/58 X |
| 5,502,702 | 3/1996 | Nakajo .......................... | 369/58 |
| 5,559,769 | 9/1996 | Ando et al. ..................... | 369/58 X |

FOREIGN PATENT DOCUMENTS 61-206962  9/1986  Japan .

*Primary Examiner*—Paul W. Huber
*Attorney, Agent, or Firm*—Shinjyu An Intellectual Property Firm

[57] ABSTRACT

The present invention is provided with a cartridge holder for installation of a cartridge which houses an optical disk, and a tray which is located below said cartridge holder and in which an unhoused optical disk is placed, and which can move to-and-fro between a position in which information are recorded and/or played back and a position in which the optical disk is exchanged, a center shaft which rotates by means of a rotating drive means, and a holding mechanism including a turntable which is secured to the shaft and is provided with a magnetic body, an optical disk centering means and a support surface which supports the optical disk; and a clamper which can be brought into contact with and separated from the support surface of said turntable and which maintains in contact with the support surface of the turntable optical disks which do not have hubs. The optical information recording/playback device allows installation of a variety of optical information recording media such as optical disk with or without hubs and optical disks which are housed in a cartridge or unhoused.

36 Claims, 24 Drawing Sheets

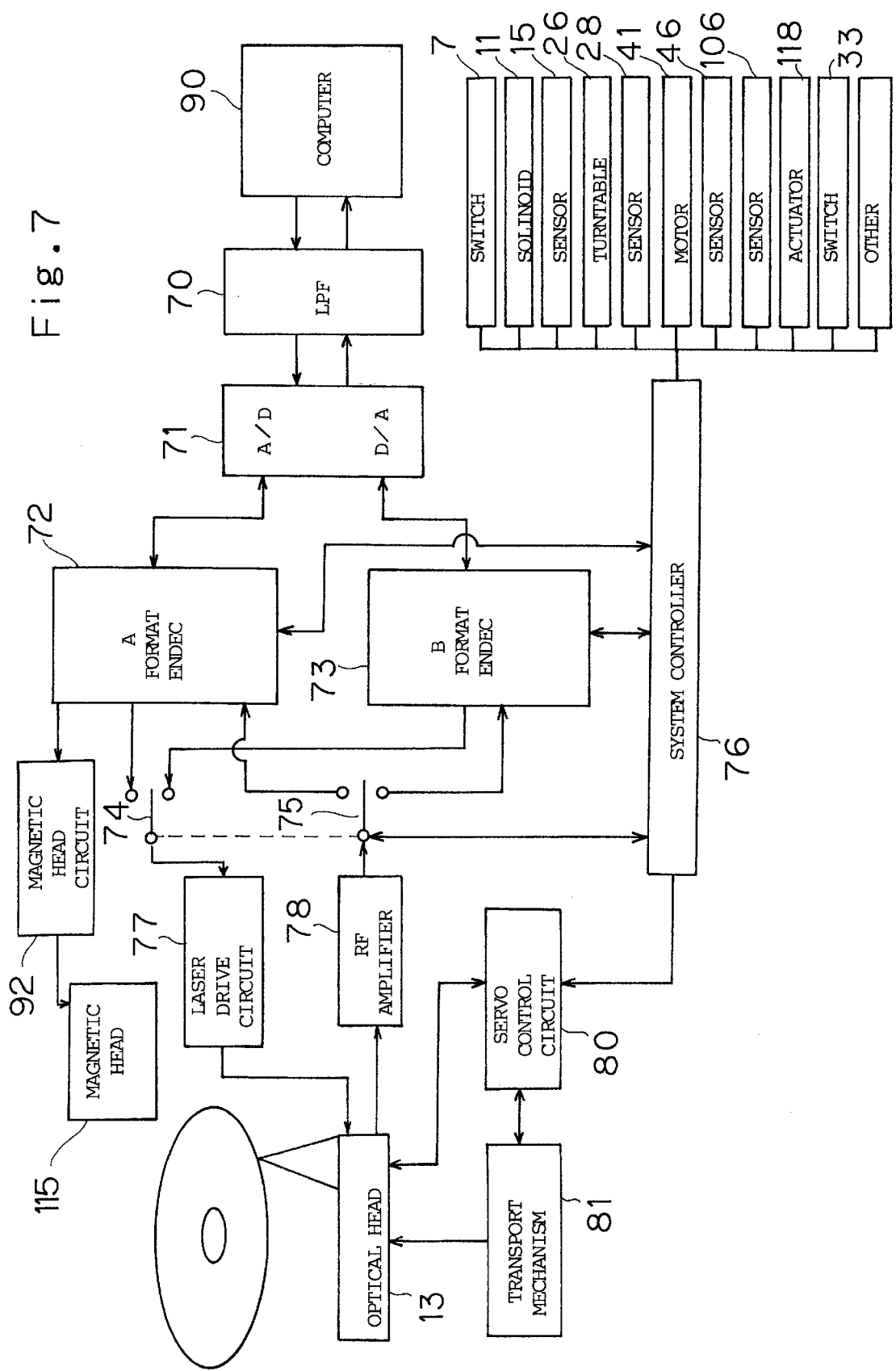

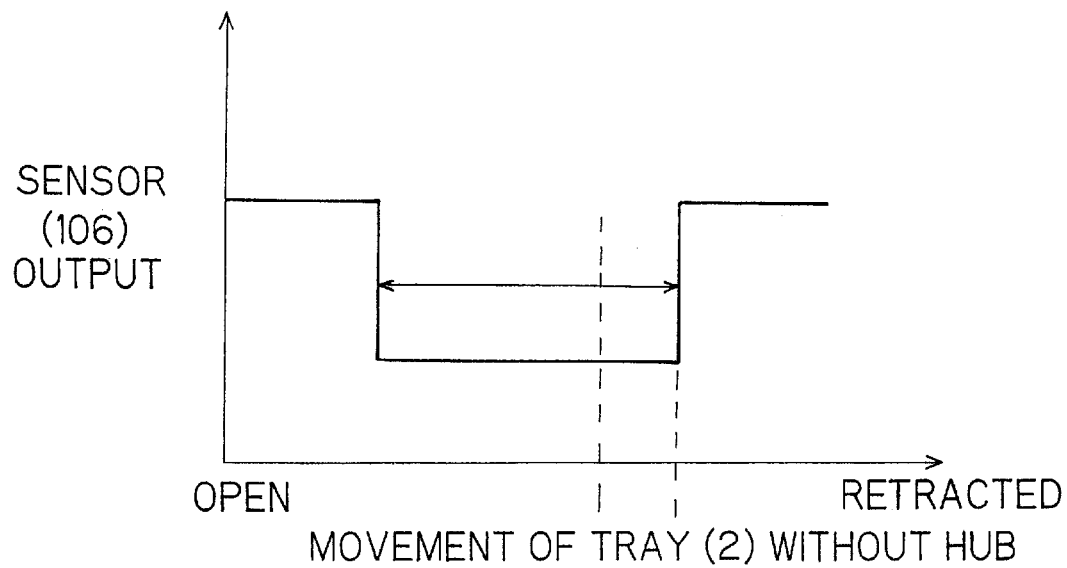
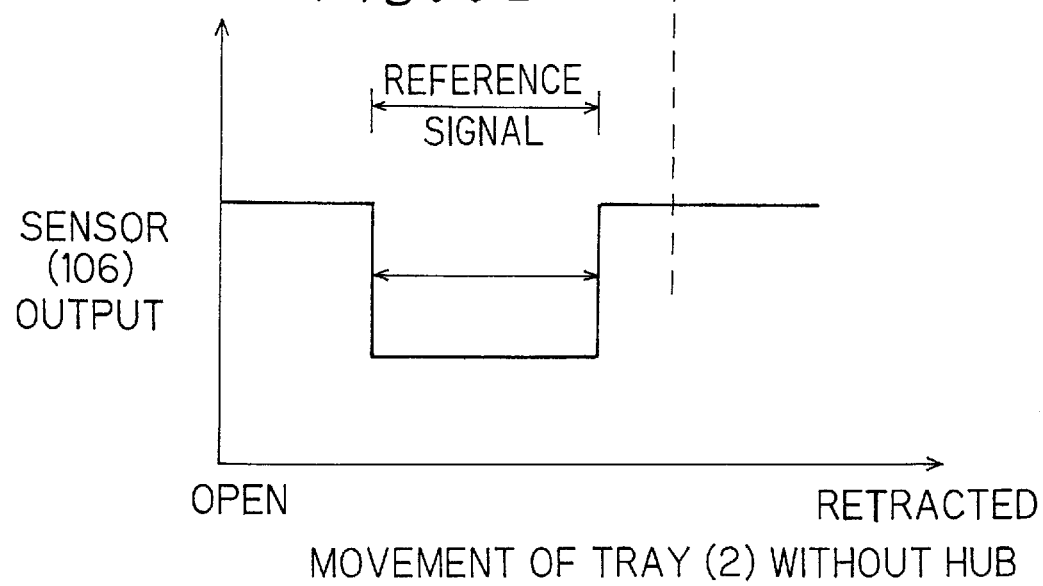

OPTICAL DISK RECORDING/PLAYBACK DEVICE WITH MEANS TO RECOGNIZE, READ FROM AND RECORD TO MULTIPLE TYPES OF OPTICAL DISK TYPES

This application is a continuation of application Ser. No. 08/523,862, filed Sep. 6, 1995, now abandoned.

BACKGROUND OF THE INVENTION

A) Field of the Invention

The present invention relates to optical information recording/playback devices which effect recording and/or playback of information by radiating an optical beam onto the surface of an optical information recording medium such as an optical disk. More particularly the present invention relates to a combined-use optical information recording/playback device in which it is possible to effect recording and/or playback of information on optical information recording media having different specifications using a single device, irrespective of the method of encoding on the optical information recording media, irrespective of whether or not the optical information recording media has a hub, and irrespective of whether or not the media is housed in a cartridge.

B) Description of the Related Art

With the wide development of multimedia in recent years there has been an increasing need for effective application of optical information recording media which can store a large amount of information or data. Consequently, there has been a sharp increase in the development in recent years of a variety of optical information recording media. Specifically, various forms of disk-shaped optical information recording media have been developed.

Disk-shaped optical information recording media or optical disks can be classified as read-only, direct read after write and rewriteable types. Rewriteable types include magneto-optical types, phase-change (crystal-amorphous transformation) types, and organic pigment types. However, one of the more widely used types is the magneto-optical type disk which may be re-written over repeatedly.

Read-only types are widely used as video disks, compact disks (CD), CD-ROMs and the like. These are generally standardized, with a center hole bored at the center of a disk, and many of them are in use. Read-only types are configured to play back pre-recorded information using an optical head. Typically, such read-only disks are used by removing the read-only type disks from a protective storage case and placing them unhoused on the tray of a playback device. The tray retracts into a playback position, the disk is centered on a turntable, clamped in place and the information can be readily read by the optical head. Such read only-type disks are standardized having a diameter of 120 mm. The center hole formed in the disks is also a standard size.

The standard for direct read after write type and rewriteable type optical disks, was fixed in 1990 for the disks to have a diameter of 130 mm. Direct read after write type disks and rewriteable type disks are provided with a hub. The hub provides a means for centering the disk in a reading device and also provide a means for magnetic clamping within the reading device. The hubs typically include a thin magnetic metal plate disposed within a center hole bored in the disk. Such disks are also usually housed in a cartridge. The cartridge is inserted directly in a recording/playback device. Upon insertion, a shutter provided in the cartridge is opened by the device, the disk is centered on a turntable in the recording/playback device using the hub, the hub is magnetically affixed to a magnetic body which is provided on the turntable. It is then possible for the rewriteable type disk recording/playback device to record information on the rewriteable disk or read information from the rewriteable disk using an optical head and a recording magnetic head.

As described above, direct read after write type and rewriteable type disk recording/playback devices are uniform, having a standard centering method and clamping method. A plurality of like disks can be used in a single device. It is possible for the drive means, optical head and the like of a single recording/playback device to be standardized. However, read-only disks such as CDs and CD-ROMs use a different encoding method and the physical specifications of the read-only disks requires a different centering method and clamping method. Further, CDs and CD-ROMs may or may not be in a cartridge. Therefore the differing types of media, rewriteable and read-only disks are not interchangeable. For instance, it is not possible to use a direct read after write type and rewriteable type disks in a CD read-only type devices. Thus, playback devices for read-only disks, and recording/playback devices for direct read after write type and rewriteable type disks to date have been separately manufactured and sold.

The typical computer user therefore has been required to purchase multiple types of devices in order to use read-only type disks, direct read after write disks and the rewriteable type disks. The manufacture of playback devices for read-only optical disks, direct read after write disks and rewriteable optical disks requires the use of some similar components. For instance, all types of devices use similar drive means and similar expensive optical heads. Consequently, an end user must pay dearly for duplicative electronic components. Further, having separate disk devices requires the use of possibly valuable space in a computer chassis. If the computer user also needs to use other peripheral devices in the computer, such as floppy disks, and input/output machines such as image scanners, then it is even more desirable to use as little space as possible for optical based reading/writing devices.

Further, read-only optical information recording media such as CDs and CD-ROMs are removed from their protective case for use, and are inserted into the playback device. Hand dirt, fingerprints, dust and the like are liable to become adhered to the surface of the CD or CD-ROM during handling, and furthermore foreign bodies are liable to be transferred to the surface during playback of the CD or CD-ROM, thereby causing unsatisfactory playback of the information. In order to prevent this, it is preferable for arrangements to be made such that information can be played back while the CD or CD-ROM is still housed in a disk cartridge.

SUMMARY OF THE INVENTION

It is thus desirable, from the point of view of manufacturing costs, ease of use and the like, to have a recording/playback device in which an optical head and other components are configured to accommodate a variety of disk types, configurations and encoding specifications, such that the device can cope easily with read-only type, direct read after write type and rewriteable-type optical information recording media.

The present invention was devised, taking into account the above mentioned problems, and aims to provide a recording/playback device in which the drive means, optical head and the like are common, irrespective of differences in specifications such as the centering method, clamping method and whether or not the medium is housed in a cartridge, and with which a single device can cope easily with read-only type, direct read after write type and rewriteable-type optical information recording media. In other words it is desired to have an optical information recording/playback device which can accommodate optical information recording media which have a hub and optical information recording media which do not have a hub, and unhoused optical information recording media and information recording media which are housed in a cartridge.

In one aspect of the invention, an optical disk recording/playback device is constructed with a housing having an optical disk retaining means disposed therein. The optical disk retaining means includes a turntable, the turntable having centering means for centering and retaining at least two differing types of optical disks within the housing, one disk at a time. The device also includes a first sensing means for sensing the presence of an optical disk in the optical disk retaining means, and a second sensing means for determining the type of optical disk disposed in the optical disk retaining means. The device also has an optical data reading means disposed in the housing for reading data stored on the disk and a magnetic recording head connected for movement with the optical data reading means for recording data on the optical disk disposed in the optical disk retaining means. A system controller electronically is connected to the optical data reading means and the first and second sensing means.

The system controller is configured to:
(a) determine an encoding format of the optical disk disposed in the optical disk retaining means in response to sensing by the second sensing means,
(b) read encoded data from the optical disk using the optical data reading means using an encoding format determined in (a);
(c) determine whether the optical disk is a rewriteable optical disk,
(d) record data on the optical disk using the magnetic recording head in response to (c) determining the optical disk is a rewriteable disk.

In another aspect of the invention, the optical disk retaining means includes a tray disposed in the housing, and means connected to the tray for selectively extending the tray partially out of the housing and for retracting the tray into the housing, the tray formed with an annular recess configured to receive CD-ROM disks and audio CDs.

In another aspect of the invention, the tray is formed with means for receiving a cartridge having an optical disk disposed therein.

In another aspect of the invention, the optical disk recording/playback device includes a third sensing means disposed adjacent to the optical disk retaining means for determining the presence of a hub formed on an optical disk disposed on the tray.

In one embodiment of the present invention, the optical disk retaining means includes a cartridge holder configured to receive an optical disk cartridge having an optical disk disposed therein.

In another embodiment of the present invention, the optical disk retaining means includes a cartridge holder configured to receive an optical disk cartridge having an optical disk disposed therein and the optical disk retaining means includes a tray disposed in the housing, and means connected to the tray for selective extending the tray partially out of the housing and for retracting the tray into the housing, the tray formed with an annular recess configured to receive CD-ROM disks and audio CDs.

In another aspect of the invention, the centering means of the turntable includes a motor having a shaft, an annular support member connected to the shaft, the annular support member formed with a tapered conical surface engagable with a center portion the optical disk, a magnetic body centered in the annular support member, and a clamp means selectively engagable with the optical disk in response to a signal from the system controller.

In another aspect of the present invention the system controller includes means for determining the presence of a hub on the optical disk. The means for determining the presence of a hub includes a light emitting sensor and a light detecting sensor disposed on opposing sides of the optical disk retaining means and connected electronically to the system controller.

In another embodiment of the present invention, an optical disk recording/playback device is constructed with a housing, a tray disposed in the housing, the tray formed with a disk retaining recess and a plurality of cartridge setting pins, the tray retractable from an open position out of the housing and to a closed position within the housing. The housing further includes urging members for urging the cartridge on to the tray when the tray is in the closed position. A main chassis within the housing supports a turntable disposed beneath the tray. An optical head is movable on the main chassis beneath an optical disk disposed in the tray and a magnetic recording head is connected to the main chassis for movement with the optical head. A system controller for controls the optical head and the magnetic recording head and a driving mechanism moves the main chassis between a standby position and a disk engaging position when the tray is the closed position. The tray is configured to support an optical disk directly on the tray and a cartridge having an optical disk therein on the cartridge setting pins.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 4a shows the support mechanism with no optical disk installed, FIG. 4b shows the support mechanism with an optical disk installed, where the optical disk does not have a central hub, and 4c shows the support mechanism with an optical disk which is housed in a protective cartridge and the optical disk therein is formed with a hub;

FIG. 7 is a block diagram of a circuit associated with the present invention for effecting recording and/or playback of information on an optical disk installed in the optical information recording/playback device depicted in FIGS. 1 through 5;

FIGS. 8a and 8b are diagrams showing a response from a sensor used in the device depicted in FIG. 1;

FIG. 17a shows the support mechanism with no optical disk installed, FIG. 17b shows the support mechanism with an optical disk installed, where the cartridge housed optical disk is not formed a central hub, and FIG. 17c shows the support mechanism with a cartridge housed optical disk which is formed with a hub;

DETAILED DESCRIPTION OF PREFERRED EMBODIMENTS

Figure 1:
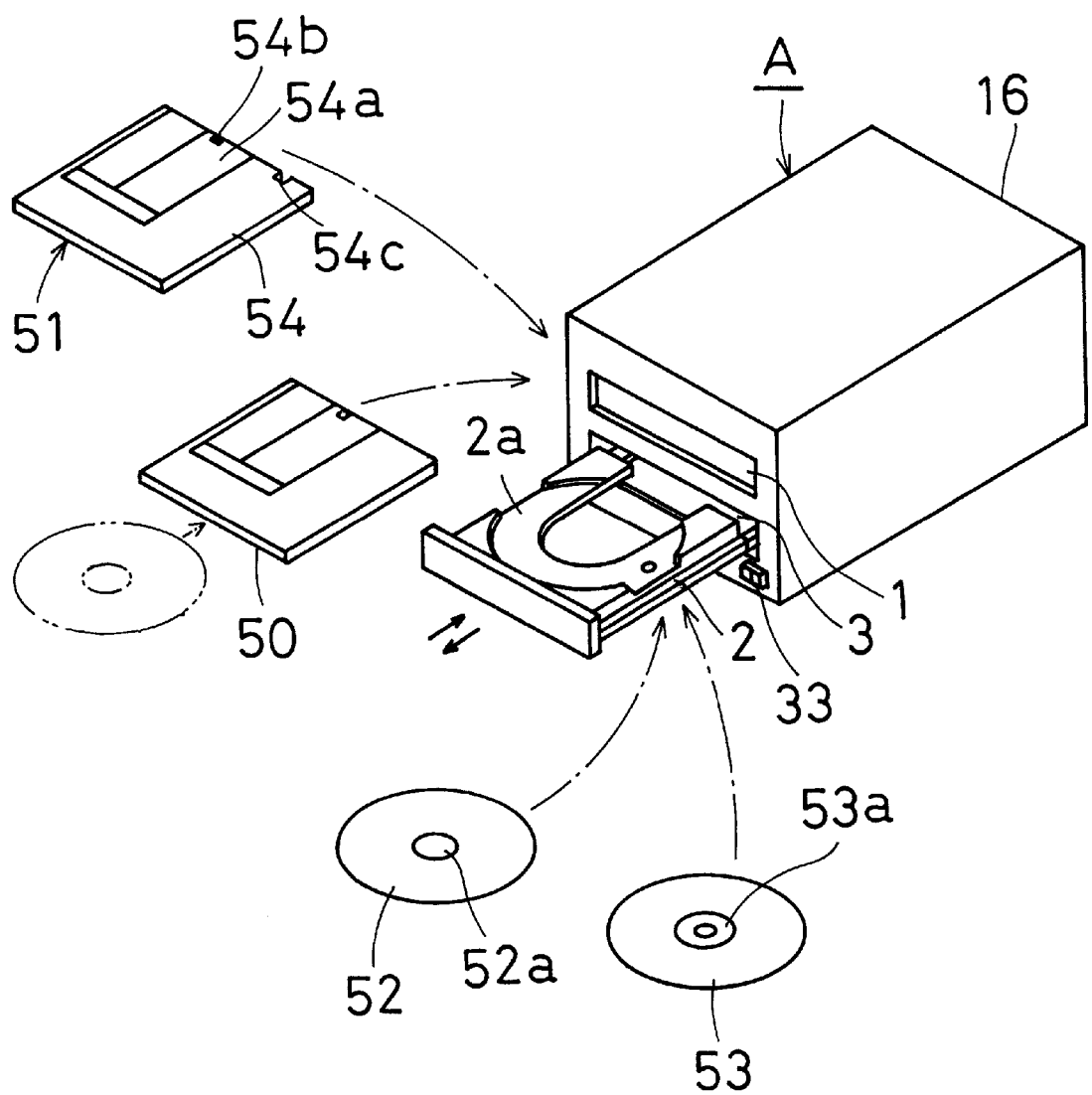
FIG. 1 is a perspective view of an optical information recording/playback device in accordance with a first embodiment of the present invention.
Figure 2:
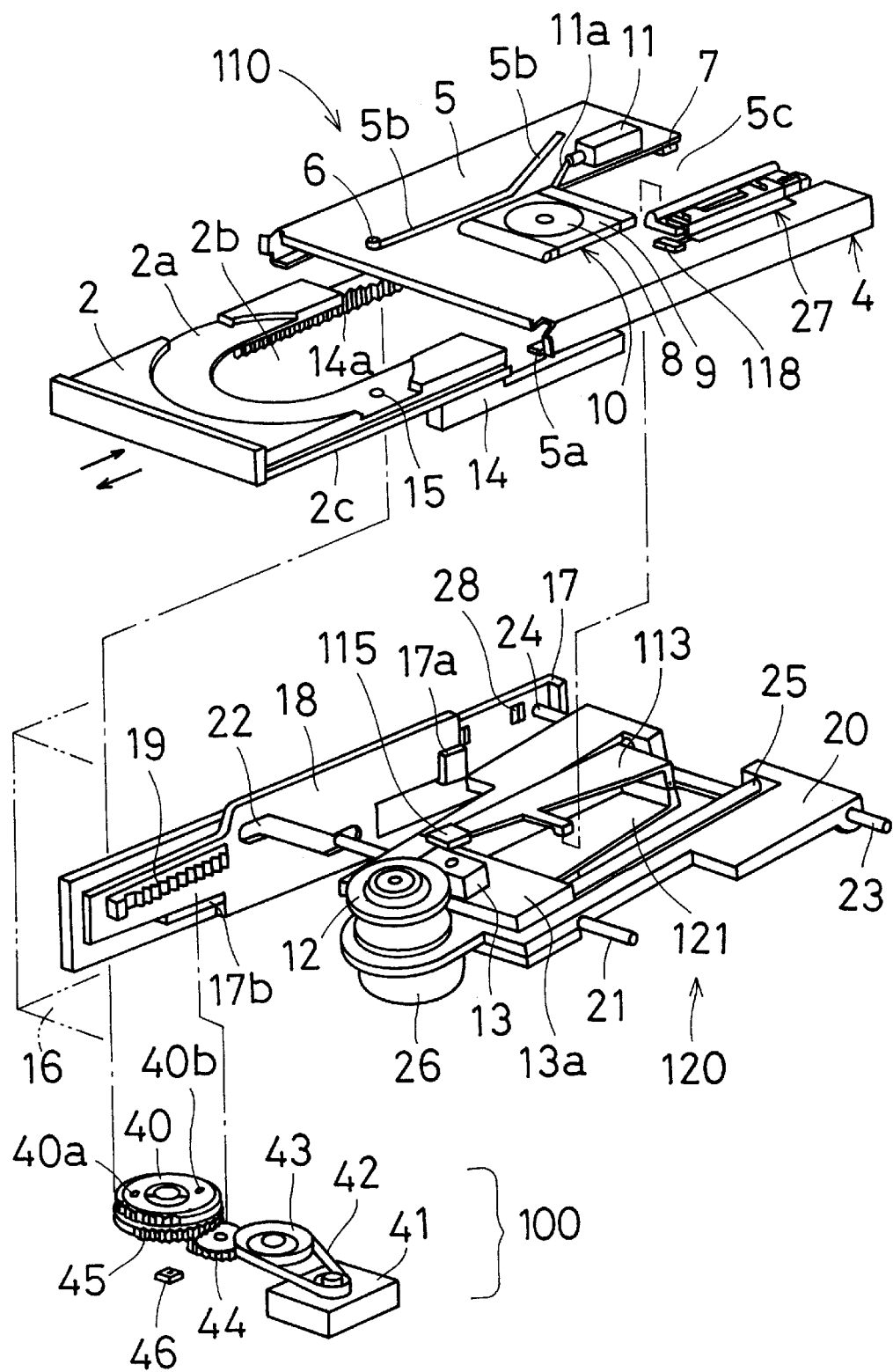
FIG. 2 is an exploded perspective view of some of the internal components of the optical information recording/playback device depicted in FIG. 1, including portions of an optical disk support mechanism, an optical head and a magnetic head.

FIGS. 1 and 2 show an optical information recording/playback device (A) in accordance with a first embodiment of the present invention. The device (A) includes a housing (16) which is formed with a first slot (1) into which optical disk cartridges are insertable. The first slot (1) is open to the front surface of the optical information recording/playback device (A). A second slot (3) is formed just beneath the first slot (1). A tray (2) is extendible though the second slot (3), as is described in greater detail below. Also depicted in FIG. 1 are various types of optical information storage media which may be used with the present invention. For instance, a disk cartridge (50) may be inserted into the first slot (1). The disk cartridge (50) may have, for example any one of a variety of CD or a CD-ROM disks housed therein. Generally, the type of disk housed in the cartridge (50) is a read only optical disk.

An alternate type cartridge (54) may also be used, the alternate type cartridge (54) having a rewriteable optical disk (51) therein. The rewriteable optical disk (51) typically includes a hub (51a), (shown in FIG. 4c). The rewriteable optical disk (51) is an optical disk that may be, for instance, a magneto-optical disk having a thin layer of magnetically sensitive material whose optical characteristics change in response to changes in magnetic orientation of the magnetically sensitive material in a manner known in the art. The cartridge (54) is further formed with a recess (54c) that indicates that the disk (51) within the cartridge (54) is a rewriteable disk, as will be explained in greater detail below.

Loose, unhoused disks (52) formed without hubs, or unhoused disks (53) formed with a hub (53a) may be put on the tray (2), as is discussed in greater detail below.

With specific reference now to FIG. 2, various components of the optical information recording/playback device (A) depicted in an exploded view, are shown removed from the housing (16). The components of the optical information recording/playback device (A) include a tray/cartridge assembly (110), a drive assembly (120) and a loading drive unit (100).

The tray/cartridge assembly (110) includes the tray (2) disposed adjacent to the second slot (3) and a cartridge holder (4) positioned adjacent to the first slot (1), both mounted within the housing (16).

The tray (2) is disposed beneath the cartridge holder (4). The tray (2) is formed with a disk recess (2a) into which the hubless optical disk (52), such as unhoused CDs or CD-ROMs, or the unhoused optical disk (53) formed with a hub (53a), may be placed. The disk recess (2a) is in the form of an annular indentation. It should be noted that for optical disks having differing diameters, a plurality of annular concentric indentations (not shown) with differing diameters may also be formed in the tray (2).

The tray (2) is movable from an open or extended position to a retracted position in a manner discussed in greater detail below. When the tray (2) is in its extended position, it extends through the second slot (3), as shown in FIG. 1. When the tray (2) is in its retracted position, it is disposed underneath the cartridge holder (4), as is shown in FIGS. 5c and 5d.

The tray (2) is further formed with an U-shaped opening (2b) (FIG. 2) which extends from a generally central portion of the recess (2a) toward a rear portion of the tray (2). Guide rails (2c) are incorporated into each side of the tray (2), thus permitting the tray (2) to move along guides (not shown) provided within the housing (16) to and from the extended position outside the housing (16) and the retracted position within the housing (16). Further, at the lower surface of the left and right edges of the tray (2), blocks (14) project from the rear half of the tray (2), extending outward parallel to the guide rails (2c). A rack (14a) having gear teeth is formed adjacent to the opening (2b) on the left hand block (14).

A sensor (15) is provided in the annular disk recess (2a) of the tray (2). The sensor (15) detects the presence of disks that are not housed in a cartridge. The sensor (15) may be an optical sensor that detects reflected light from a disk disposed in the tray (2), a mechanical switch type sensor or the like.

The cartridge holder (4) may be formed by, for instance, deforming a sheet-like body into an upper plate (5) having side portions and guide portions (5a) as shown in FIG. 2. The cartridge (50) may be inserted into the cartridge holder (4) through the first slot (3), the inserted cartridge being supported from underneath by the guides (5a).

The upper plate (5) of the cartridge holder (4) is formed with a guide slot (5b). The guide slot (5b) has a straight portion and an angled portion that extends lengthwise in the front-to-back direction of the upper plate (5). The upper plate (5) is provided with a shutter hook (6) that is disposed in the guide slot (5b) such that it can slide within the guide slot (5b). The shutter hook (6) mates with a cartridge mating hole (54b) formed in the cartridge (54) when the cartridge (54) is inserted into the first slot (1), and slides along the guide slot (5b), thereby urging the shutter (54a) to open.

Further, a limit switch (7) is provided on the lower surface of the upper plate (5) at an end of the guide slot (5b), thereby making it possible to detect whether or not a cartridge has been inserted. An elongated opening (5c) is formed in the upper plate (5). A support plate (9) and a clamper (8) are disposed in the opening (5c) such that the support plate (9) limited movement vertically. The support plate (9) is coupled via a parallel movement mechanism to a shaft (11a) of a solenoid (11). The shaft (11a) and the solenoid (11) are provided along the left side of the opening (5c). The support plate (9) is configured to move vertically, but remains generally parallel to the upper plate (5) in accordance with the movement of the shaft (11a) of the solenoid (11). The clamper (8) is mounted within the support plate (9) with freedom to rotate within the center of the support plate (9), and serves as an optical information recording medium clamp means (10), as will be described in greater detail below.

Referring again to FIG. 2, the drive assembly (120) is mounted inside the housing (16) and includes drive frame (20) and a subframe (17). However, only one subframe (17), the left side, is shown. It should be understood that a pair of left and right subframes (17) are secured within the housing (16). A slider (18) is configured to slide in the front-to-back direction along guides (17a) and (17b) which are formed in the subframes (17). It should be understood that there are also two sliders (18), a left side slider and a right side slider, although, only the left side slider (18) is depicted in FIG. 2. A rack (19) is formed with gear teeth on the left slider (18).

An inclined slot (22) is formed in the left slider (18) and on the right slider (not shown). The drive frame (20) is formed with outwardly extending following shafts (21). The tips of following shafts (21), which extend outwardly from the sides of a drive frame (20), extend into the inclined slots (22). Shafts (23) project outwardly from the base edges of the drive frame (20). The shafts (23) are supported axially in bearings (24) disposed in the subframe (17), a second bearing (24) is also disposed in the second subframe (not shown) and thus the drive frame (20) can pivot about the shaft (23).

A rectangular opening is formed in the drive frame (20) bordered by a pair of parallel guide shafts (25) which extend from the front to the back of the opening. An optic head housing (13a) is mounted for linear movement on the guide shafts (25) and an optical head (13) is mounted on the optic head housing (13a). Movement of the optical head (13) is effected by a linear motor (not shown). A spindle motor (26) is secured to the tip of the drive frame (20). Atop the spindle motor is a turntable (12). When the sliders (18) slide in the front-to-back direction, the following shafts (21) follow the inclined slots (22) and move in an upward direction so that the drive frame (20) rotates about the shaft (23) and the turntable (12) and optical head (13) can be raised to engage a disk or lowered through the opening (2b) in the tray (2) so that the tray (2) may freely extend out of the second opening (2) in the housing (16).

A sensor (28) for detecting the position of the slider (18) is provided in the subframe (17), and it detects the rear position of the slider (18), in other words the end of movement of the tray (2) to the recording and/or playback or retracted position.

Figure 3:
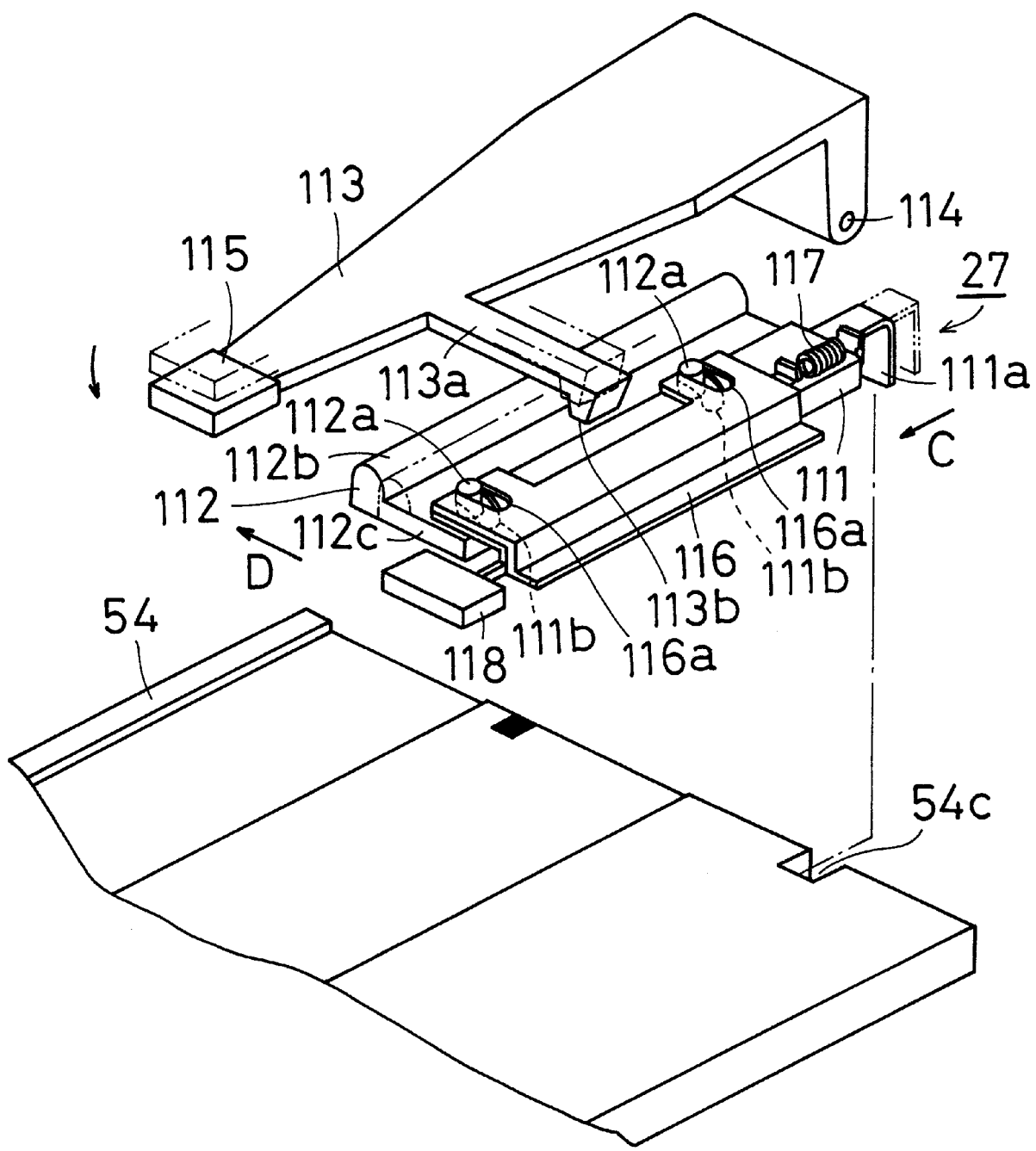
FIG. 3 is a fragmentary exploded perspective view of the magnetic head depicted in FIG. 3, shown with an optical disk cartridge.

As shown in FIGS. 2 and 3, a connection plate (121) is rigidly connected to the optic head housing (13a) for movement therewith, and hence for movement with the optical head (13). A magnetic head support arm (113) is connected by a support spindle (114) to the connection plate (121). A magnetic recording head (115) is mounted at one end of the support arm (113).

A magnetic head raising/lowering mechanism (27) is disposed on the upper plate (5). Although the support arm (113) is pivotally mounted to the optic head housing (13a) via the connection plate (121), when the device (A) is assembled, the support arm (113) is disposed above the supper plate (5). Hence, the magnetic head raising/lowering mechanism (27) is disposed underneath the support arm (113), as is indicated in FIG. 3.

The magnetic head raising/lowering mechanism (27) includes a detection slider (111) is provided with a detection plate (111a) that mates with a cartridge detection slot (54c) formed in the disk cartridge (54). The detection slider (111) is also formed with slide holes (111b), shown in phantom in FIG. 3. The slide holes (111b) have an arcuate shape. A slide plate (116) is rigidly attached to the upper plate (5). The slide plate (116) is formed with two slider slots (116a) corresponding to the two slide holes (111b). Beneath both the slide plate (116) and the detection slider (111) is a slide bar (112), positioned such that the detection slider (111) is confined between the slide bar (112) and the slide plate (116). The slide bar (112) is formed with two pins (112a) each extending through one of the slider slots (116a) and through a corresponding one of the slide holes (111b). The slide bar (112) is further formed with a projecting strip part (112b) which extends the length of the slide bar (112), and a flat part (112c).

The detection slider (111) and the detection plate (111a) are biased by a spring (117) so that the detection plate (111a) is disposed in the position shown in solid lines in FIG. 3. The position of the detection plate (111a) shown in double dot-dash lines is in response to a disk cartridge (50) formed without the write enable detente (54c), as is explained in greater detail below.

Due to the configuration of the slider slots (116a) and the slide holes (111b) and the pins (112a) extending therethough, the slide bar (112) is able to move in the (D) direction in response to movement in the (C) direction of the detection slider (111).

The magnetic head support arm (113) rotates about the support spindle (114). The magnetic head support arm (113) is formed with an extended arm (113a) and a sliding projection part (113b). The sliding projecting part (113b) is positioned to engage the projecting strip part (112b).

When the sliding projecting part (113b) contacts the projecting strip part (112b), the magnetic head support arm (113) is moved upward in FIG. 3 preventing the magnetic head (115) from making contact with any disks installed in the device (A). When the projecting strip part (112b) is moved in the (D) direction, as in FIG. 3, the sliding projecting part (113b) does not contact the projecting strip part (112b) and the magnetic head support arm (113) is allowed to moved downward thus allowing the magnetic head (115) to make contact with any rewriteable disks installed in the device (A) and can record data on such rewriteable disks.

The detection slider (111) is engaged by an actuator (118) which includes a position detecting means. The actuator (118) is provided on the upper plate (5) of the cartridge holder (4). The actuator (118) urges the detection slider (111) in the position shown in broken lines in FIG. 3 until a signal from the limit switch (7) indicates the presence of a cartridge in the device (A). The signal from the limit switch (7) causes the actuator (118) to disengage the detection slider (111) allowing the spring (117) to urge the detection slider (111) into the position indicated in solid lines in FIG. 3. Then, if the cartridge loaded has a detection slot (54c), the detection slider (111) may move in the direction of the arrow (C), and the detection plate (111a) mates with the detection slot (54c). Consequently the slide bar (112) moves in the direction of the arrow (D), the sliding projecting part (113b) of the extended arm is separated from the projecting strip part (112b) of the slide bar, the magnetic head support arm (113) rotates about the support spindle (114) and the magnetic head (115) is lowered to the recording position. Then the actuator (118) detects movement of the detection slider (111) in the direction of the arrow (C). The actuator (118) then provides a signal to a system controller (76), described below with respect to FIG. 7, that indicates that recording or writing onto the disk loaded in the device (A) permissible. With a cartridge (50) which does not have a detection slot, the detection plate (111a) comes into contact with the end surface of the cartridge (50), and therefore the magnetic head (115) is held in a standby position, separated from the recording position. The actuator (118) detects that the detection slider (111) has not moved and is in the standby position, and generates a signal indicating that recording by the magnetic head (115) is not permissible.

The movement of the tray (2), so that the tray (2) may extend out of the housing (16) and retract back into the housing (16), is effected by the loading drive unit (100). The loading drive unit (100) includes an upper gear (40) and a motor (41). The upper rear (40) is positioned to engage the rack (14a) on the block (14) of the tray (2). Power is transmitted to the upper gear (40) by means of the rotation of a rotating motor (41), via a belt (42), a belt wheel (43), a gear (not shown) which is provided coaxially with the belt wheel (43), a center gear (44) and a transmission gear (not shown) which is provided coaxially with the upper gear (40). Thus the tray (2) moves in accordance with the forward and reverse rotation of the upper gear (40).

A lower gear (45) for raising and lowering the turntable is secured integrally below the upper gear (40), as will be described below. The lower surface of the lower gear (45) is provided with a light reflecting surface (not shown). Gear teeth are provided over ⅔ of the circumference of the upper gear (40). Gear teeth are likewise provided over ⅔ of the circumference of the lower gear (45). The teeth on the upper gear (40) and lower gear (45), while coaxial, are angularly offset from one another by a predetermined angle. A pair of detector holes (40a) and (40b) are provided for detecting the angular position of the gears (40) and (45). The pair of holes (40a) and (40b) are symmetrically formed within the upper gear (40). Projected light from a reflection-type sensor (46) is able to enter the detection holes (40a) and (40b) via through-holes (not shown) provided in the lower gear (45) in positions corresponding to the detection holes (40a) and (40b) in the upper gear. The holes (40a) and (40b) are positioned to be indicative of the tray (2) being in either its retracted position or its extended position. Light detected passing though the detection hole (40a) indicates the position of the tray (2). Otherwise, light is reflected off the light reflecting surface formed on the lower gear (45) back to the sensor (46).

The rack (14a) is arranged such that it engages the upper gear (40) of a loading drive unit (100), and the tray (2) is moved to-and-fro in the front-to-back direction between the recording and/or playback position and a disk install position by means of the forward or reverse rotation of the upper gear (40).

The rack (19) in the slider (18) engages with the lower gear (45), and the slider (18) slides in the front-to-back direction in response to the rotation of the lower gear (45).

With unhoused optical disk installed in the tray (2), control of movement of the tray between the extended position and the retracted position, and control of the raising and lowering of the drive frame (20) are performed by means of the detector holes (40a) and (40b) which are provided on the upper gear (40), and the sensor (28) which is provided on the subframe (17). When an optical disk housed in cartridge is installed in the cartridge holder (4), control of the raising and lowering of the drive frame (20) is performed by means of the detector hole (40a) which is provided on the upper gear (40), and the sensor (28) which is provided on the subframe (17).

The opening (2b) in the tray (2) allows for generally vertical movement of the turntable (12) and the optical head (13) when the tray (2) is in the retracted position, for recording and/or playback, but a gap is maintained between a information recording medium, such as the disk (52), and the optical head (13) such that the optical head (13) can move in along the guide shafts (25) to read information stored on the optical disk disposed in the tray (2).

Figure 4A:
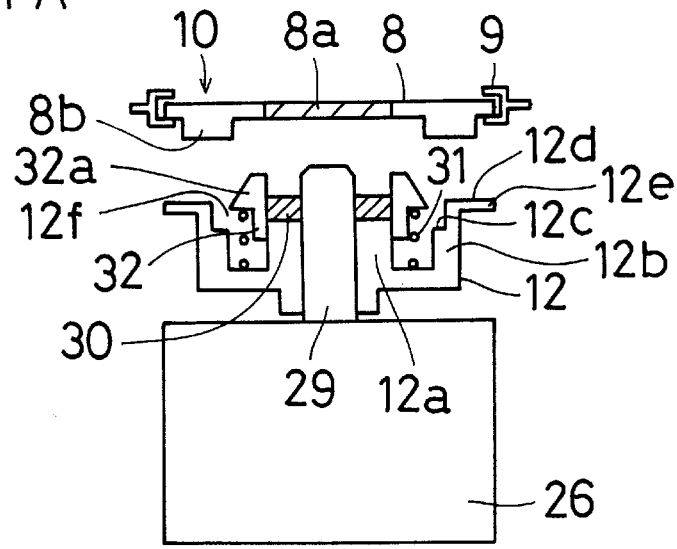
FIGS. 4a, 4b and 4c are fragmentary, cross section, schematic views showing portions of the optical disk support mechanism depicted in FIG. 2, and used in the optical information recording/playback device depicted in FIG. 1, where

Portions of the tray/cartridge assembly (110) and portions of the drive assembly (120) define a support mechanism, as shown in FIG. 4(a). The support mechanism of the optical information recording medium includes the turntable (12), which is secured to a center shaft (29) of the spindle motor (26), and the clamp means (10).

Figure 4B:
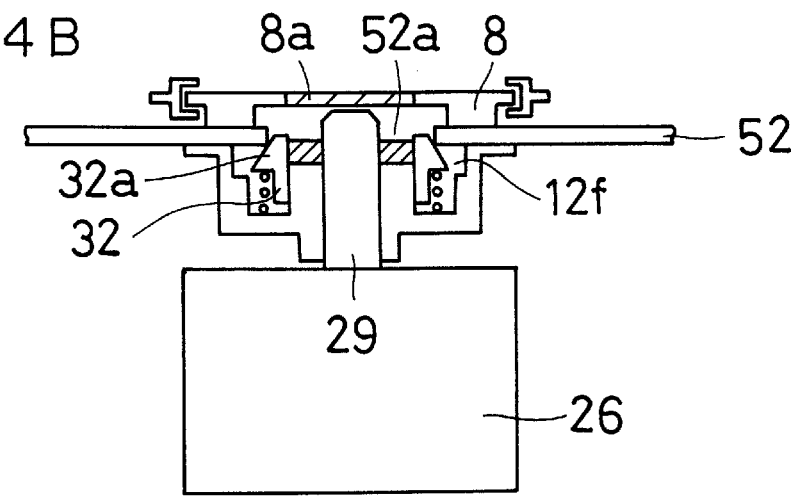
Figure 4C:
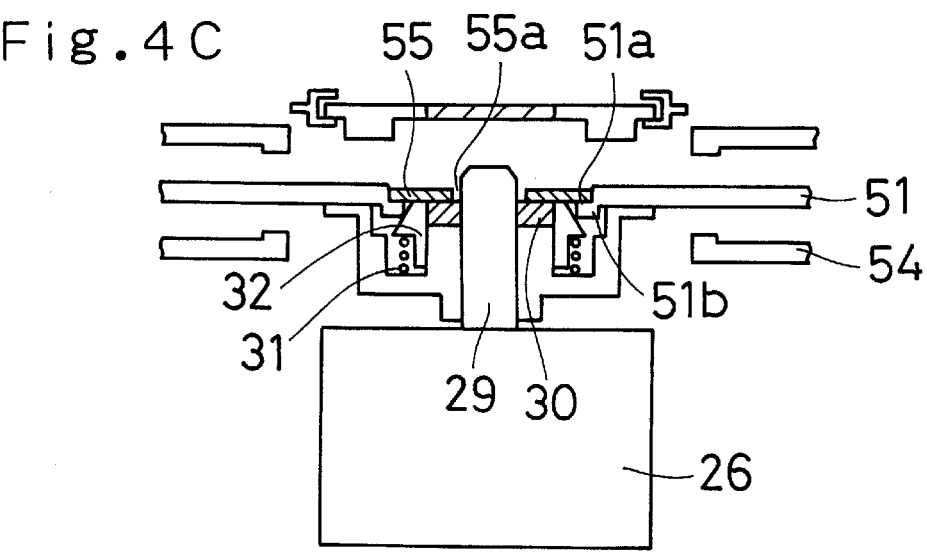

The turntable (12) is a cup shaped member, as shown in FIGS. 4a, 4b, and 4c having an inner cylindrical part (12a) and an outside cylindrical part (12b). An annular opening (12f) is defined within the turntable (12) between the inner cylindrical part (12a) and the outside cylindrical part (12b) concentrically with the center shaft (29). An annular magnet (30) is secured to the top surface of the inside cylindrical part (12a), concentrically with the center shaft. When an optical information recording medium, such as disk (51) is installed in the optical information recording/playback device (A), its hub (51a) is magnetically attached thereto (FIG. 4c). A compressed coil spring (31) is disposed with play between the inside and outside cylindrical parts (12a) and (12b). A cylindrical member (32) for centering is inserted above the compressed coil spring (31) with freedom to slide in the vertical direction. The upper edge of the cylindrical member (32) is provided with a flange (32a) which has a conical centering outer surface, and by bringing the lower surface of the flange (32a) into contact with the compressed coil spring (31) the cylindrical member (32) is urged upward.

A step (12c) is provided on the inside of the outside cylindrical part (12b), and a flange (12e) which has a flat support surface (12d) for supporting an optical disk is provided on an outer portion of the outside cylindrical part (12b).

The clamp means (10) is disposed concentrically above the center shaft (29). As stated above, the clamp means (10) includes the disk-shaped clamper (8) and the support plate (9). The support plate (9) supports the clamper (8) providing a predetermined clearance between the support plate (9) and clamper (8) such that the clamper (8) can rotate above the center shaft (29) and the support surface (12d) of the turntable. The clamper (8) can thus be brought into contact with and separated from the center shaft (29) and the turntable (12). A concentric circular magnetic body (8a) is secured at the center of the clamper (8). Optical disks which do not have hubs are maintained in contact with the support surface (12d) of the turntable and a bottom edge of an annular projection (8b), by means of the magnetic attractive force between the magnetic body (8a) and the annular magnet (30). The magnetic forces thus make it possible for the optical disks to rotate integrally with the turntable. For optical disks which do have hubs, movement of the shaft (11a) of the solenoid (11) is controlled to prevent the clamper (8) from being brought into contact with the disk, consequently, the clamper (8) is held in a predetermined upper position without being magnetically attached to the center shaft (29).

FIG. 4a shows the clamper (8) and the turntable (12) in a position ready for installation of an optical disk, but where no disk has yet been installed. As shown in FIG. 4(b), an unhoused optical disk (52) which does not have a hub, for example CDs and CD-ROMs, has been installed. After an unhoused optical disk (52) has been installed, the turntable (12) is raised from a retracted position (FIG. 4a) to an engaging position (FIG. 4b) by movement of the slider (18). The flange (32a) then makes contact with the center hole (52a) of the unhoused optical disk, and the disk (52) is centered above the turntable (12). Further, the clamper (8) is lowered by movement of the solenoid (11). Thus the disk (52) is maintained in contact with the support surface (12d) of the turntable by the clamper (8). The magnetic attractive force between the magnetic body (8a) of the clamper and the annular magnet (30) causes the flat surface at the lower edge of the annular projection (8b) at the outer lower surface of the clamper (8) to press the unhoused optical disk (52) into contact with the support surface (12d) of the turntable.

It should be noted that the construction of the clamp means is not limited to that described above. It is also possible to adopt other suitable known constructions to secure the unhoused optical disk to the outer lower surface of the clamper.

As shown in FIG. 4c, an optical disk (51) housed in a cartridge (54) having a hub (55) has been installed. The disk (51) may be, for example, a magneto-optical disk in which a hub (55) is formed with a hole (55a), the hub (55) being secured to an annular step (51a) of the disk (51). After the disk (51) is installed, the turntable (26) is raised from its retracted position (FIG. 4a) to its engaging position (FIG. 4c) by movement of the slider (18). As the turntable (20) is raised, the disk (51) is centered by the turntable (12) and is held against the support surface (12d) by the hub (55) being magnetically attached to the annular magnet (30) of the turntable (26). As the turntable (12) is raised, the center shaft (29) is inserted with play into the hole (55a). However, as can be seen in FIG. 4c, the hole (55a) is larger than the shaft (29), therefore there is play between the hub (55) and the shaft (29). Further, the annular projection (51b) on the lower surface comes into contact with the conical centering outer surface of the flange (32a) of the cylindrical member and is automatically centered, while the hub (55) is magnetically attached to the annular magnet (30) of the turntable (12). At this time, the cylindrical member (32) compresses the coil spring (31), and slides downward following the cylindrical part (12a) on the inside of the turntable (12). At this time, the clamp means (10) is held in a raised position (FIG. 4c) to keep it from contacting the disk (51).

With reference now to FIGS. 5a, 5b, 5c and 5d within the housing (16) two sensors are disposed, a light emitting sensor (104) and a light detecting sensor (106). The sensors (104) and (106) are positioned near the front of the housing (16) but are centrally located so that light from the sensor (104) can pass though the center hole (52a) of the disk (52) as the tray (2) is drawn into the housing (16). As will be explained in greater detail below, movement of an optical disk, such as the disk (52) in FIG. 5b between the light emitting sensor (104) and the light detecting sensor (106), causes the light detecting sensor (106) to produce a signal provides a means for detecting the presence of a hub formed on an optical disk.

As is shown schematically in FIG. 7, the device (A) includes a system controller (76) which is connected to a variety of circuit components, some described above. For instance, the system controller (76) is connected: to the limit switch (7) which detects installation of a cartridge; the solenoid (11) which effects movement of the clamp means (10); the sensor (15) which detects the presence of disks that are not housed in a cartridge; the turntable (26); the sensor (28) which detects the position of the slider (18); the loading motor (41); the reflection-type sensor (46) which detects the position of the gears (40) and (45); the light detecting sensor (106) which provides means for detecting the presence of a hub formed on an optical disk; and the actuator (118) which senses whether or not an optical disk housed in a cartridge is rewriteable.

A description will now be given relating to the actions when recording to and/or playing back from an optical information recording medium using an optical information recording/playback device in the embodiment described above.

FIGS. 5a, 5b, 5c and 5d depict the optical information recording/playback device (A) when an unhoused optical disk (52) such as a CD or a CD-ROM, which does not have a hub, is installed. It should be noted that the magnetic head (115), the magnetic head support arm (113) and various related parts have been removed from FIGS. 5a, 5b, 5c and 5d to provide greater clarity.

Figure 5A:
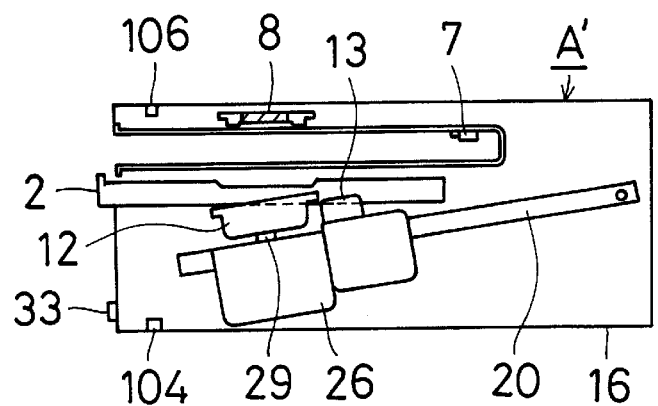
FIGS. 5a, 5b, 5c and 5d are side schematic views of the optical information recording/playback device depicted in FIG. 1, showing portions of the support mechanism depicted in FIGS. 4a, 4b and 4c, illustrating the movement of various components of the support mechanism where an optical disk is installed in the optical information recording/playback device, where the optical disk is not housed in a protective cartridge and the magnetic head and other elements are not shown to provide greater clarity.

FIG. 5(a) shows the retracted or standby state prior to installation of the unhoused optical disk (52). The tray (2) is in the retracted position. The detection hole (40a) of the upper gear (40) is located directly above the reflection-type sensor (46), the upper gear (40) is engaged with the rack (14a) and the lower gear (45) is engaged with the rack (19), and furthermore the clamper (8), the turntable (12) and the optical head (13) are in retracted or standby positions.

Figure 5B:
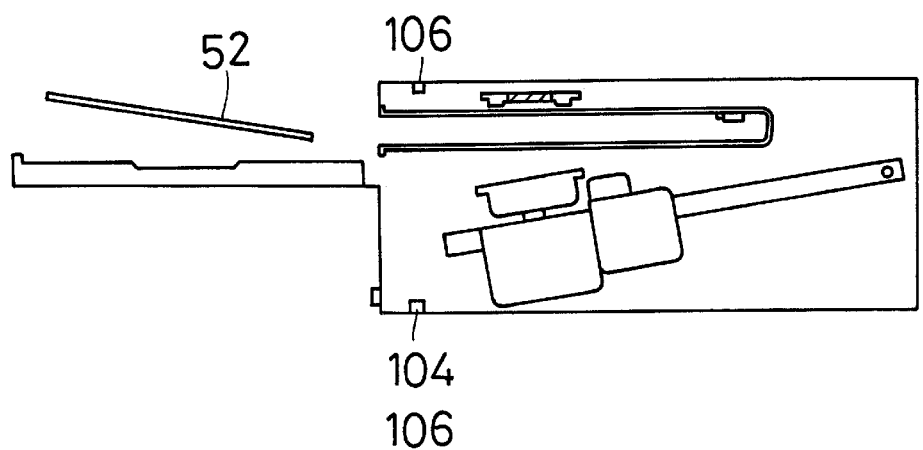
Figure 5C:
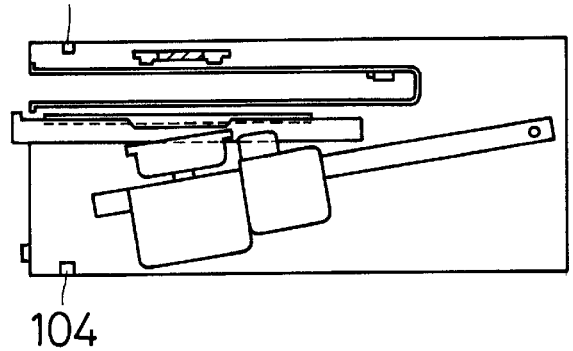
Figure 5D:
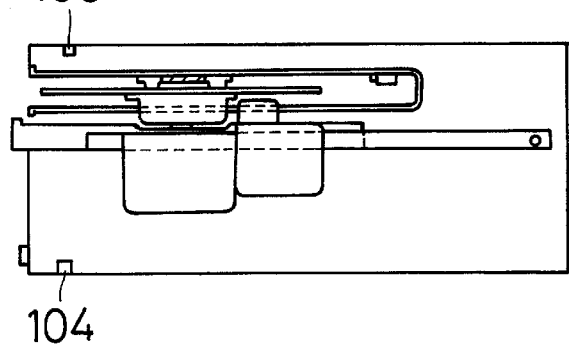

If an eject switch (33) on the housing (16) is pressed while in the state shown in FIG. 5a, a signal from the switch (33) causes the loading motor (41) to begin rotating, and via the belt (42) and the center gear (44), the upper gear (40) and lower gear (45) rotate in the counterclockwise direction, the rack (14a) is moved forward and the tray (2) extends to the position shown in FIG. 5b. Immediately after the commencement of the action to extend the tray (2), the lower gear (45) and the rack (19) become disengaged since the lower gear (45) is in the position in which it has no teeth, and thus the slider (18) does not move, and the drive frame (20) remains in the lowered state. When the upper gear (40) has rotated through 180°, and the detection hole (40b) is in a position directly above the reflection-type sensor (46), rotation of the loading motor (41) stops, based on a signal from the reflection-type sensor (46), and the tray (2) is thus withdrawn to the exchange position (see FIG. 2 and FIG. 4(b)).

If an unhoused optical disk (52) is placed on the tray (2), the sensor (15) issues a signal to the system controller (76) indicating that it has detected the unhoused optical disk (52) in the tray (2). Then, if the eject switch (33) is pressed again a signal is sent to the system controller (76). Based on the signal, the system controller (76) activates the loading motor (41). The loading motor (41) begins rotating in the clockwise direction, and the tray (2) is drawn into the housing (16) by the rearward movement of the rack (14a). Immediately before the tray (2) is pulled in as far as the retracted, or recording and/or playback position, the lower gear (45) and the rack (19) return from the disengaged state to the engaged state. The system controller (76) determines whether or not there is a hub based upon the output of the sensor (118). It should be noted that if no optical disk is placed on the tray (2), then no detection signal is issued by the sensor (15), and tray (2) is held in its retracted state (FIG. 5(c)).

If a disk (52) has been installed, the tray (2) is pulled into its retracted position (FIG. 5c), the upper gear (40) reaches the position in which there are no teeth to engage the rack (14a), the upper gear (40) and the rack (14a) become disengaged, and the tray (2) stops in the recording and/or playback position. Then, as the lower gear (45) rotates in the clockwise direction, the driving force from the lower gear (45) is transmitted to the rack (19), and the slider (18) moves backward. In accordance with this, the following shaft (21) rises, following the shape of the inclined slot (22) of the slider (18). Thus the drive frame (20) rotates about the bearing (24), the turntable (12) and the optical head (13) rise and pass through the opening (2b) in the tray, and the center hole (52a) of the unhoused optical disk (52) which does not have a hub and is placed on the tray (2) comes into contact with the conical centering outer surface of the flange (32a) of the cylindrical member (32) of the turntable and is automatically centered. The sensor (28) detects the slider (18) due to the rearward movement of the slider (18), and when the detection signal is issued, the loading motor (41) is stopped by this signal by the controller (76). Then, based on a signal from the sensor (106) which detects whether or not there is a hub, indicating that there is no hub, the solenoid (11) operates, extending the solenoid shaft (11a), the support plate (9) is lowered, and the optical disk (52) is pressed into contact and held between the support surface (12d) of the turntable and the clamper (8) by means of the magnetic attractive force between the magnetic body (8a) of the clamper and the annular magnet (30) which is concentric with the center shaft (29) of the spindle motor (26) (see FIGS. 2, 4(b) and 5(d)). The optical head (13) is moved to a predetermined playback position, and it is possible to read data on the disk.

If a hub has been detected on the disk by the sensor (106), then the system controller (76) does not actuate the solenoid (11) and the clamp means (10) remains in an upper or standby position, for instance as shown in FIGS. 5a, 5b and 5c.

It should be noted that in order to eject the unhoused optical disk (52) which does not have a hub from the device (A), the reverse of the above described operations is performed. For instance, the system controller (76) may respond to a command from an attached computer or interface to eject the disk, or the button (33) may be pushed to eject the tray (2) in steps similar but reverse to the ones described above.

Next, a description will be given relating to the actions relating to installation into the optical information recording/playback device (A) of an optical disk (51) which has a hub and is housed within a cartridge, for example a magneto-optical information recording medium.

Figure 6A:
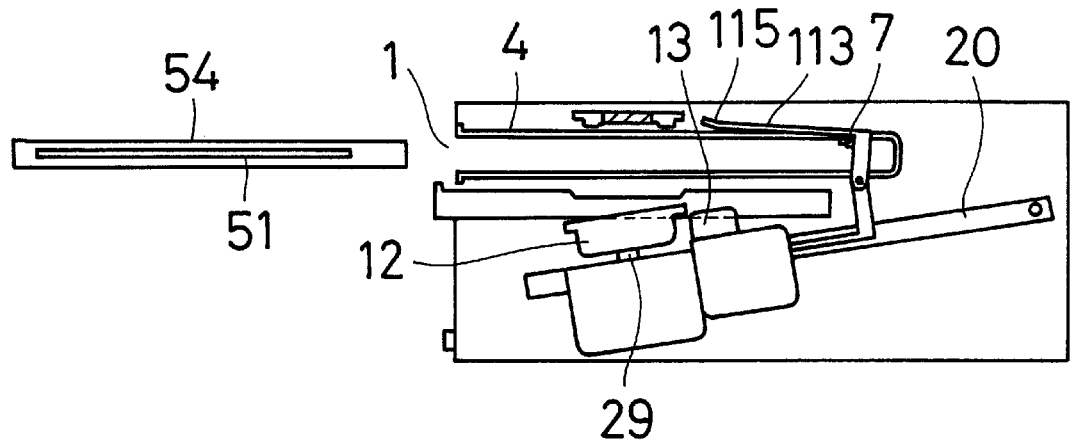
FIGS. 6a, 6b and 6c side schematic views of the optical information recording/playback device depicted in FIG. 1, similar to FIGS. 5a, 5b, 5c and 5d, illustrating the movement of various components of the support mechanism when an optical disk is installed in the optical information recording/playback device, where the optical disk is housed in a protective cartridge, is formed with a hub and is a rewriteable optical disk, and, as shown in FIG. 6c the magnetic head engages the optical disk for recording information thereon.

FIG. 6(a) shows the standby state before installation of the optical disk (51), with the optical disk (51) placed directly in front of the first slot (1) for insertion of the cartridge (54).

Figure 6B:
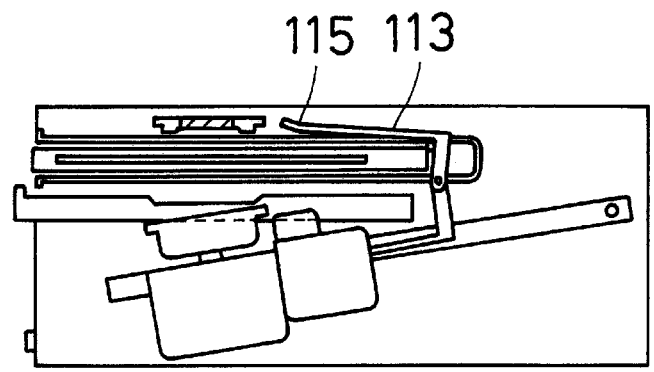

When the cartridge (54) is inserted into the cartridge holder (4), the shutter hook (6) mates with the cartridge mating hole (54b), and as the cartridge (54) is inserted, the shutter hook (6) slides along the guide slot (5b), and the cartridge shutter (54a) is opened. When the rear edge of the cartridge (54) presses the limit switch (7), a signal is issued indicating that installation of the cartridge (54) has been completed, as shown in FIG. 6b. The controller (76) then causes the loading motor (41) to rotate. Since the upper gear (40) is in the position in which it there are no teeth engaged with the rack (14a), the tray (2) being in the retracted position within the housing (16) (FIG. 6b), the rotation of the loading motor (41) is transmitted to the rack (19) by the lower gear (45), and the slider (18) moves to the rear. In accordance with this, the following shaft (21) is raised, following the inclined groove (22) of the slider (18), bringing the drive frame up into the position shown in FIG. 6c. Thus the drive frame (20) rotates about the bearing (24), the turntable (12) and the optical head (13) are raised and pass through the open bottom of the cartridge holder (4), the center shaft (29) is inserted with play into the hole (55a), which has play, of the hub (55) which is exposed by the opening of the cartridge (54a) of the optical disk (51) which has a hub, and then the annular projection (51b) at the lower surface comes into contact with the conical centering outer surface of the flange (32a) of the cylindrical member and is automatically centered, while the hub (55) is magnetically attached to the annular magnet (30) on the turntable. The optical head (13) moves to the predetermined recording and/or playback position as the drive frame (20) rises.

At this time, the cylindrical member (32) presses the compressed coil spring (31), slides downward following the cylindrical part (12a) at the inside of the turntable (12), and thus becomes co-planar with the annular magnet (30). As a result, the optical disk (51) which has a hub and is housed in a cartridge is held on the support surface (12d) of the turntable in a centered state, and the optical disk (51) is magnetically held (see FIGS. 1, 2, 4c and 6c).

Figure 6C:
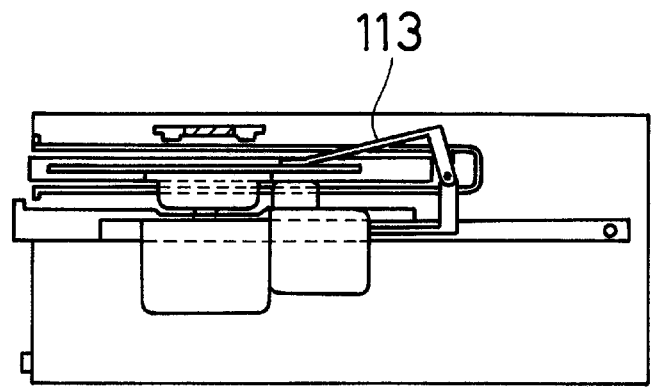

If the sensor (7) provides a signal to the system controller (76) that indicates that there cartridge (54) installed, then the solenoid (11) is not activated and the clamper (8) is held in the standby position away from the disk, as depicted in FIG. 6c. Further, as described above, if the magnetic head raising/lowering mechanism (27) detects that the cartridge (54) includes a recess (54c) indicating that the disk (51) is a rewriteable disk, then the magnetic head is able to move downward, as shown in FIG. 6c, to a predetermined recording position and is thus possible to perform recording.

It should be noted that the reverse operations to those mentioned above should be performed in order to eject the optical disk (51) which has a hub and is housed within a cartridge from the device (A). At this time, the sensor (40b) detects the lowered position of the drive frame (20), and the loading motor (41) stops driving.

Descriptions were given above relating to the actions when installing in the optical information recording/playback device (A) an unhoused optical disk (52) which does not have a hub, and relating to the actions when installing an optical disk (51) which has a hub and is housed within a cartridge, for example a magneto-optical disk, but installation into the optical information recording/playback device (A) of unhoused optical information recording media (53) which do have hubs, and disk cartridge (50) which do not have hubs and are housed in a cartridge is also possible.

A description will now be given of the recording and/or playback operation based on the circuit shown in FIG. 7. For instance, in a first case (I) a magneto-optical disk is installed in the optical information recording/playback device (A) as an optical information recording medium which is housed in a cartridge, and in a second case (II) a CD is installed in the optical information recording/playback device (A) as an unhoused optical information recording medium which does not have a hub. The system controller (76) is provided with circuitry which includes an A format endec (72) (an encoder/decoder; referred to as an endec hereinbelow), and a B format endec (73), such that it is possible to read and store data from and to optical disks having differing the recording and/or playback formats.

In the first case (I), if a magneto-optical disk is installed in the optical information recording/playback device (A), such as the disk (51) within the cartridge (54), a signal from the switch (7) indicates the presence of the cartridge (54). The system controller (76) based upon the reference signal from the switch (7) checks the status of a pair of change-over switches (74) and (75) and changes their respective settings, if necessary, from a central position shown in FIG. 7 such that the A format endec (72) circuits are completed. Further, a signal from the actuator (118) indicates whether or not a magneto-optical disk is installed that is rewriteable. If the disk installed is a rewriteable disk, a recess (54c) being formed on the cartridge (54), then a record command signal is output from a system controller (76), and the A format encoder (72) enters the state in which recording modulation is permitted.

A servo control circuit (80) connected to the system controller (76) is driven by control signals from the system controller (76). The control signals from the system controller (76) bring the optical head (13) to a predetermined position close to the magneto-optical disk (51) and thus it is possible for laser light to be irradiated from the optical head (13) onto the surface of the magneto-optical disk (51) for recording or for reading of data. If recording is commanded, typically such commands come from an interface, such as a computer (90). The computer (90) sends a recording input signal through an LPF (low pass filter) (70), and then through an A/D converter (71), and is converted into a digital signal, and is A-format modulated by the A format encoder (72). The signal from the A format encoder (72) is then transmitted to a magnetic head drive circuit (92). The signal is supplied as a recording signal to the magnetic head (13), a recording magnetic field is applied to the magneto-optical disk as shown in FIG. 26. Simultaneously, strong laser light for recording is irradiated from the optical head (13) by means of a laser drive circuit (77). By means of the recording magnetic field from the magnetic head and the laser light from the optical head (13), information is recorded on the magneto-optical disk (51). Recording to the magneto-optical disk is performed continuously by moving the magnetic head and optical head (13) together in the radial direction of the magneto-optical disk. Movement of the magnetic head and the optical head (13) in the radial direction is performed by controlling a transport mechanism (81) such as a linear motor using a servo control circuit (80).

In order to play back information from a magneto-optical disk which has been recorded using A format modulation, the A format decoder (72) is set to playback modulation by a playback command signal from the system controller (76). Meanwhile, the servo control circuit (80) is driven by means of a command signal from the system controller (76), the optical head (13) is brought close to the magneto-optical disk, and a state is entered such that laser light can be irradiated onto the magneto-optical disk surface for playback. Strong laser light for playback is irradiated from the optical head (13) by means of the laser drive circuit (77), and the reflected light from the magneto-optical disk surface is received by the optical head (13). The resulting received signal passes through an RF amplifier (78) and is demodulated by the A format decoder (72). The demodulated signal is D/A converted by the converter (71) into an analog signal, passes through the LPF (70) and is output. The optical head (13) is transported in the radial direction of the magneto-optical disk, continually playing back information from the magneto-optical disk. Transport of the optical head (13) in the radial direction is performed under the control of a transport mechanism (81) such as a linear motor, by means of the servo control circuit (80).

In the case (II), if a CD is installed in the tray (2) of the optical information recording/playback device (A), unhoused, and without a hub, a signal from the sensor (15) indicates the presence of a CD such as the disk (52). The system controller (76) positions the change-over switches (74) and (75) from the central position shown in FIG. 7 to complete the circuit connection to the B format endec (73).

In order to play back information from a disk (52) which has been recorded using B format modulation, the B format decoder (73) is set to a state in which playback modulation is possible, by means of a playback command signal from the system controller (76). Meanwhile, the servo control circuit (80) is driven by means of a command signal from the system controller (76), the optical head (13) is brought close to the CD, and laser light is irradiated onto the CD recording surface for playback. Strong laser light for playback is irradiated from the optical head (13) by means of the laser drive circuit (77), and reflected light from the CD recording surface is received by the optical head (13). The resulting received signal passes through the RF amplifier (78) and is demodulated by the B format decoder (73). The demodulated signal is D/A converted by the converter (71) into an analog signal, passes through the LPF (70) and is output. The optical head (13) is transported in the radial direction of the CD, and playback of information from the CD is performed continuously. Transport of the optical head (13) in the radial direction is performed under the control of a transport mechanism (81) such as a linear motor, by means of the servo control circuit (80).

It should be understood that reading the disk (53) formed with hub (53a) is generally the same as the case (II) above, with the exception that the presence of a hub is detected by the system controller (76) using a signal from the sensor (106). Since disks with hubs are generally encoded using the A type format endec, the necessary circuitry associated with the system controller (76) is enabled to read the disk having a hub.

The function of the light emitting sensor (104) and light detecting sensor (106) will now be described with reference to FIGS. 8a and 8b.

The light emitting sensor (104) continuously emits a beam of light directed to the light detecting sensor (106). The light detecting sensor (106) generally emits two levels of signal output. The light detecting sensor (106) outputs a high output signal when light from the light emitting sensor (104) is received by the light detecting sensor (106) and a low output signal when little or no light is received from the light emitting sensor (104). The high output signal and low output signals are shown in FIGS. 8a and 8b. After a disk, such as the disk (52) has been installed in the tray (2), the tray begins to retract into the housing (16) and the disk (52) passes between the light emitting sensor (104) and the light detecting sensor (106). As the tray (2) begins being retracted into the housing (16), the optical disk (52) prevents light from the sensor (104) from reaching the sensor (106). However, once the hole (52a) of optical disk (52) is positioned over the sensor (104), light from the sensor (104) is again able to reach the sensor (106). The same is true of movement of the optical disk (53).

The movement of the disk (52) between the sensors (104) and (106) verses the output response of the sensor (106) is plotted in FIG. 8b. Further, the movement of the disk (53) (having a hub (53a)) between the sensors (104) and (106) verses the output response of the sensor (106) is plotted in FIG. 8a. As is clear from a comparison of FIGS. 8a and 8b, movement of the disk (52) and the movement of the disk (53) between the sensors (104) and (106) cause different outputs from the sensor (106).

The system controller (76) controls the movement of the tray (2) via the motor (41). The motor (41) rotates at a generally constant speed, once engaged. Therefore, the tray (2) moves at a generally constant speed. The system controller (76) monitors signals from the light detecting sensor (106) and compares the output from the light detecting sensor (106) with the movement of the tray (2). Since the hole (52a) is larger than a corresponding hole in the hub (53a) of the disk (53), as the optical disk (52) and the tray (2) are retracted into the housing (16) the disk (53) with the hub (53a) will block light between the sensors (104) and (106) for a longer period of time than will the optical disk (52) with no hub.

The system controller (76) is provided with a reference signal shown in FIG. 8b. The system controller (76) compares the output of the sensor (106) to determine whether or not a hub is present on a disk installed in the tray (2). For instance, as shown in FIG. 8a the output of the sensor (106) is at a lower level for a longer period of time, as sensed by the system controller (76) when the disk (53) having the hub (53c) is installed in the device (A). But when the disk (52) having no hub is installed, as shown in FIG. 8b, the signal from the sensor (106) is at a lower level for a shorter period of time.

Figure 9:
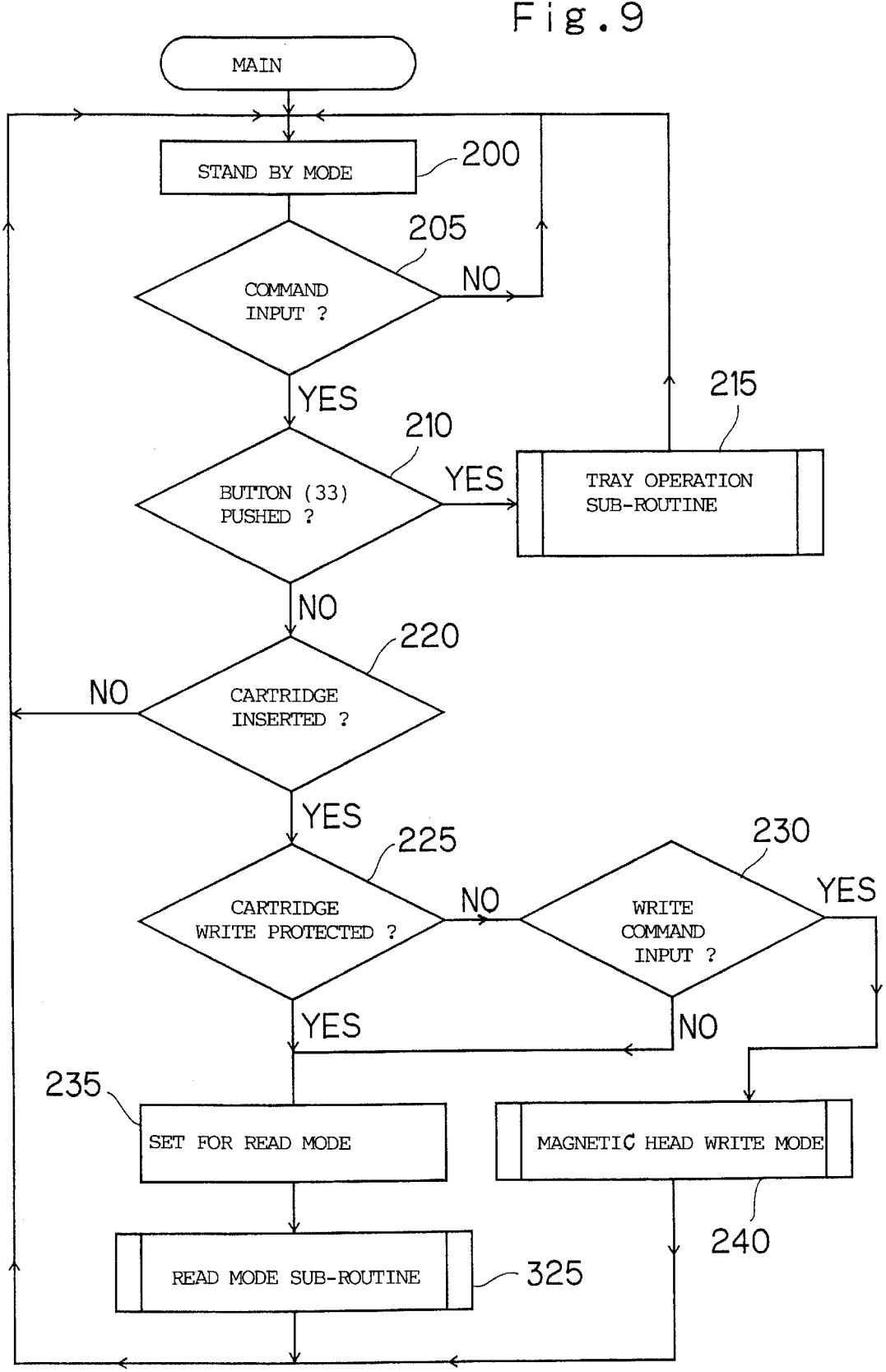
FIGS. 9–14 are flowcharts depicting various operational and electronic functions performed by the circuit depicted in FIG. 7.

FIG. 9 depicts a first flowchart that outlines some of the operations controlled by the system controller (76). Typically, the system controller (76) remains in a standby mode (200) awaiting commands from an interface, such as the computer (90), as shown by a decision box (205) in FIG. 9. However, the system controller (76) also monitors signals from various sensors, as described above. If the button (33) on the housing (16) is pushed, the system controller (76) determines such action at decision box (210) initiates a Tray Operation Routine represented by box (215). The Tray Operation Routine (215) is described in greater detail with reference to FIG. 11 herein below.

Returning now to FIG. 9, if the button (33) has not been pushed, the system controller (76) also monitors the status of the switch (7) to see if a cartridge has been inserted, as represented by decision box (220). If no cartridge has been inserted into the first slot (1), then the system controller (76) cycles to the standby mode (200) and continues to monitor.

If a cartridge has been inserted into the first slot (1) and the switch (7) provides a signal indicating so, the system controller (76) sets the switches (74) and (75) to complete the circuit to the A format endec (72). The system controller (76) also checks the status of the actuator (118) to see if the disk within the installed cartridge is a rewriteable disk, as represented in decision box (225). If the disk is a rewriteable disk, the system controller (76) then checks to see if a write command has been sent by, for instance, the computer (90), as represented by decision box (230). If the disk installed is not a rewriteable disk, as determined in the decision box (225), the circuitry depicted in FIG. 7 is set for read mode only (235). The Read Mode Subroutine (325) is then enabled. After the Read Mode Subroutine (325), the system controller (76) returns to the standby mode (200). The Read Mode Subroutine (325) is described in greater detail with reference to FIG. 14 hereinbelow.

Returning to the decision box (230), if the system controller (76) has not received a write command, the system controller (76) again sets the circuitry depicted in FIG. 7 is set for read mode only (235). Returning again to the decision box (230), if the system controller (76) has received a write command, the system controller (76) enables the Magnetic Head Write mode (240). After writing is complete, the system controller (76) returns to the standby mode (200).

Figure 10:
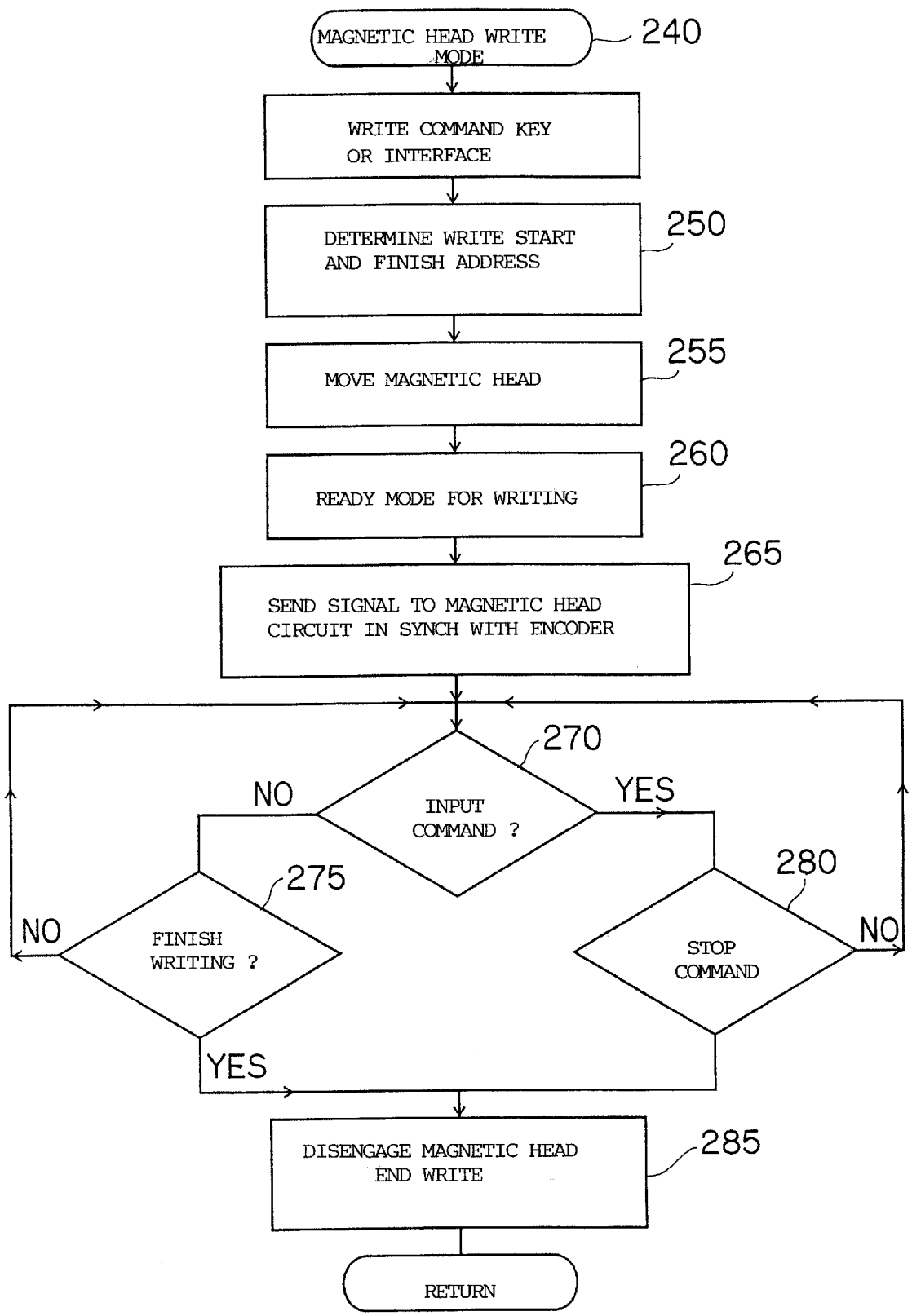

Operations relating to the Magnetic Head Write Mode (240) are depicted in FIG. 10. In order to write on a disk, such as the disk (51), the system controller (76) first must determine a write start and a write finish address on the physical surface of the disk (51), as represented by the box (250). Then the system controller (76) must send signals to move the magnetic head (115) and the optic head (13) to a position corresponding to the write start address on the disk (51) as shown by box (255). The system controller (76) then sets the circuitry in FIG. 7 to be ready for writing at box (260). The system controller (76) sends signals to the magnetic head circuit (92) and the ended (72) for synchronous operation writing data (265).

While the writing process is in progress, the system controller (76) monitors for commands and monitors the write process as shown in decision box (270). If a command has been input, the system controller (76) checks to see if it is an interrupt or stop write command as shown in decision box (280). If no command has been input, then the system controller (76) continues monitoring the write process. If the write process is completed as determined in decision box (275), the magnetic head (115) is disengaged from writing, and the write mode is dis-enabled, as shown in box (285). Operation of the system controller (76) returns to the standby mode.

Figure 11:
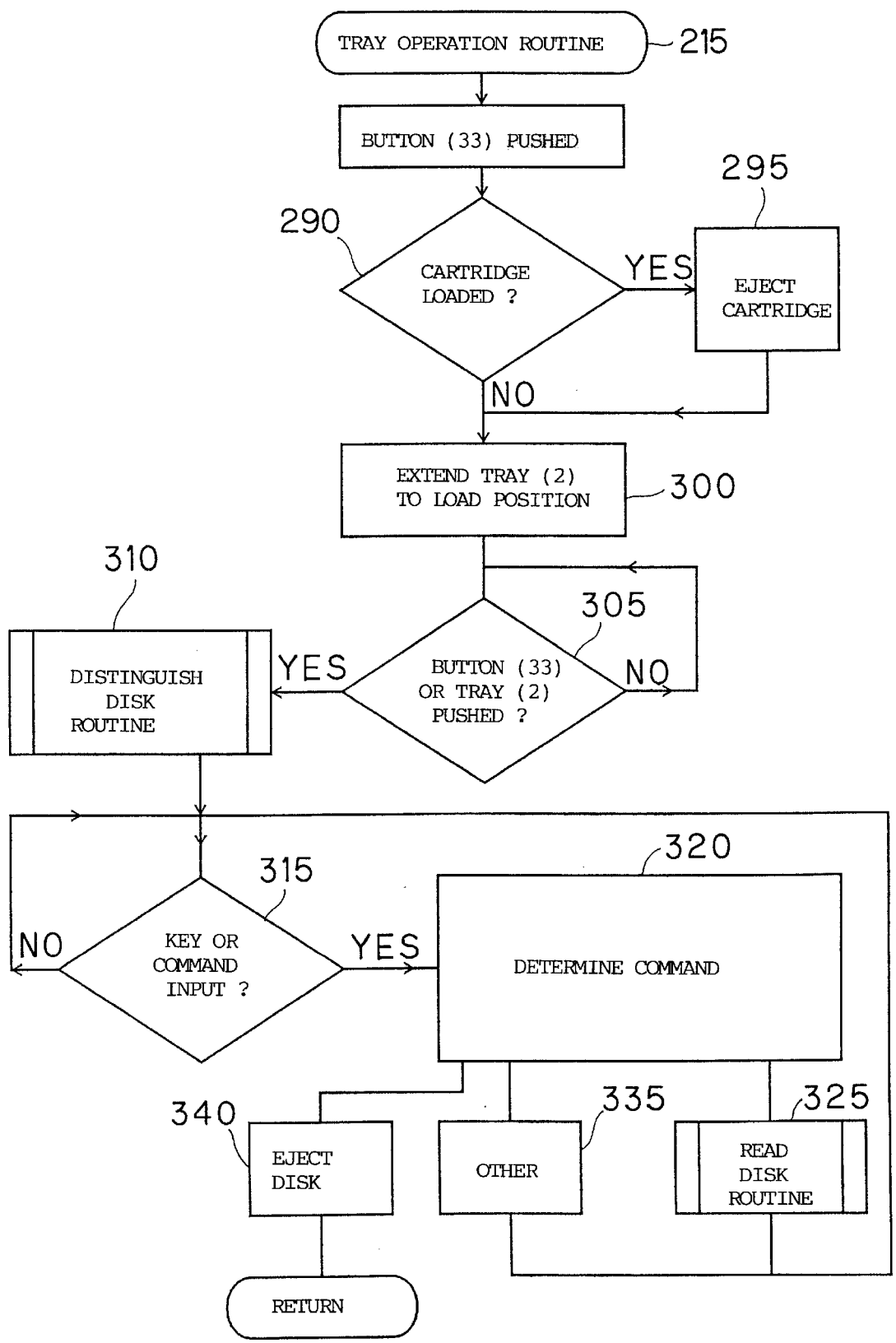

If the Tray Operation Routine (215), indicated in FIG. 9, is enabled, the operations as generally outlined in FIG. 11 are carried out by the system controller (76). First, if the button (33) has been pushed, the system controller (76) checks to see if a cartridge is currently installed, as shown in the decision box (290). If so, the cartridge is ejected as shown in box (295). Next, the tray (2) is extended to an open position, as shown in box (300) in FIG. 11. The tray (2) can retract into the housing (16) by either pushing the button (33) or by a command issued by, for instance, the computer (90) as shown by the decision box (305). If either the button (33) or a command issues to retract the tray (2), a Distinguish Disk Routine (310) is enabled. The Distinguish Disk Routine (310) is described in greater detail with respect to FIG. 12 herein below.

At decision box (315), the system controller (76) monitors to see if any commands have been issued. In box (320) the type of command issued is determined. If data is required from the installed disk, a Read Disk Routine (325) is enabled, as described in greater detail with respect to FIG. 14 below. If an eject disk command issues the disk is ejected at box (340) and the system controller (76) returns to the standby mode. Other operations may be possible as represented by box (335).

Figure 12:
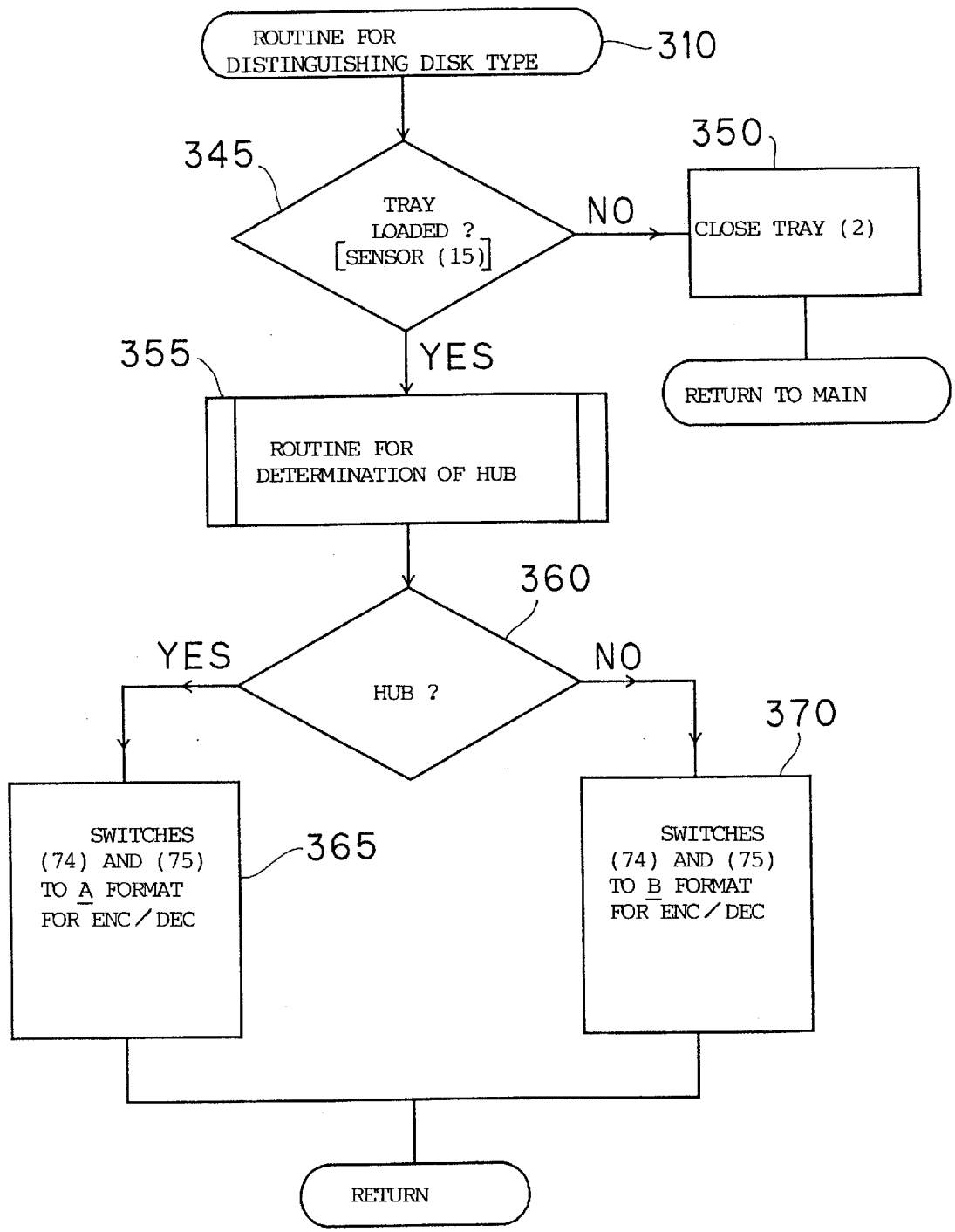

If the Distinguish Disk Routine (310), as shown in FIG. 11, is enabled, the operations generally outlined in FIG. 12 are initiated by the system controller (76). With reference now to FIG. 12, the system controller (76) checks to see if the tray (2) has been loaded with a disk by checking the signals from the sensor (15) as shown in decision box (345). If no disk has been installed on the tray (2), the tray (2) is retracted or closed and the system controller (76) returns to the standby mode, as shown in box (350).

If a disk has been installed on the tray (2), a Routine For Determination Of Hub (355) is enabled to determine the presence of a hub on the disk. The Routine For Determination Of Hub (355) is described in greater detail with reference to FIG. 13 below. Returning now to FIG. 12, once the Routine For Determination Of Hub (355) is completed, the system controller (76) decides the next course of action depending upon whether there is a hub or not at decision box (360). If there is a hub on the disk, then the A format endec is enabled by setting switches (74) and (75) at box (365). If there is no hub on the disk, then the B format endec is enabled by setting switches (74) and (75) at box (370). The system controller (76) then returns to the operations outlined in FIG. 11.

Figure 13:
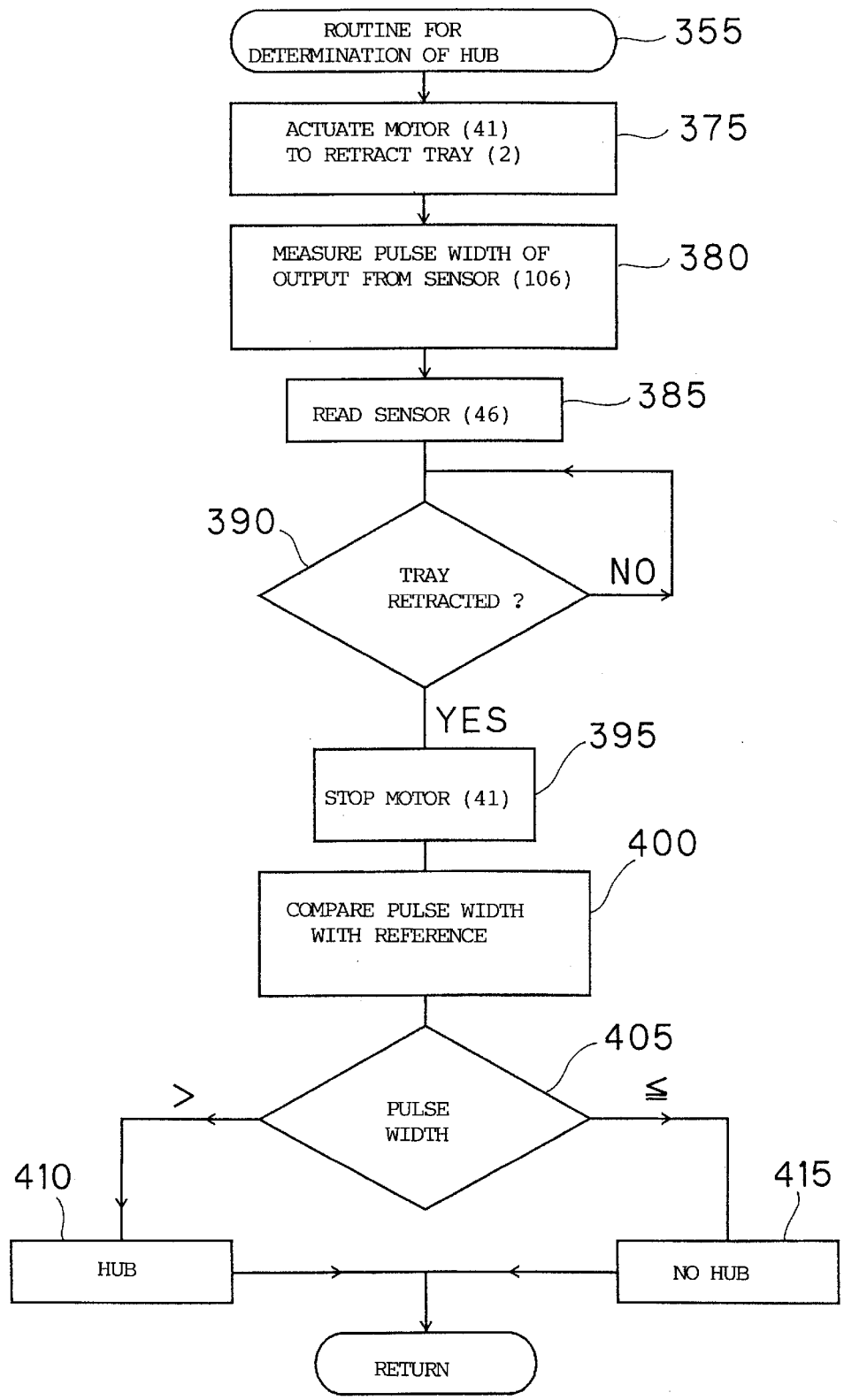

The Routine For Determination Of Hub (355) which is enabled during the operations outlined in FIG. 12 will now be described with reference to FIG. 13. In FIG. 13, the Routine For Determination Of Hub (355) begins when the system controller (76) activates the motor (41) to move the tray (2) into a retracted position as indicated by box (375). As shown in FIGS. 8a and 8b, the signal from the sensor (106) is monitored by the system controller (76) in timed synchronization with the movement of the tray (2). The system controller (76) measures the pulse width of the output from the sensor (106) at box (380) in FIG. 13. At box (385) the sensor (46) is monitored to indicate the tray (2) is in the retracted position within the housing (16). In the decision box (390), the system controller (76) determines whether or not the tray (2) is indeed retracted. Once the tray (2) has reached the retracted position, the motor (41) is stopped at box (395). The system controller (76) then compares in box (400) the output of the sensor (106) with the reference signal pulse width shown in FIG. 8b. As represented by the decision box (405), the system controller (76) determines from the pulse width of the output from the sensor (106) whether or not there is a hub formed on the disk installed on the tray (2). Whether there is a hub (410) or no hub (415) used in subsequent steps of the operations depicted in FIG. 12 where the control of the system controller (76) returns.

Figure 14:
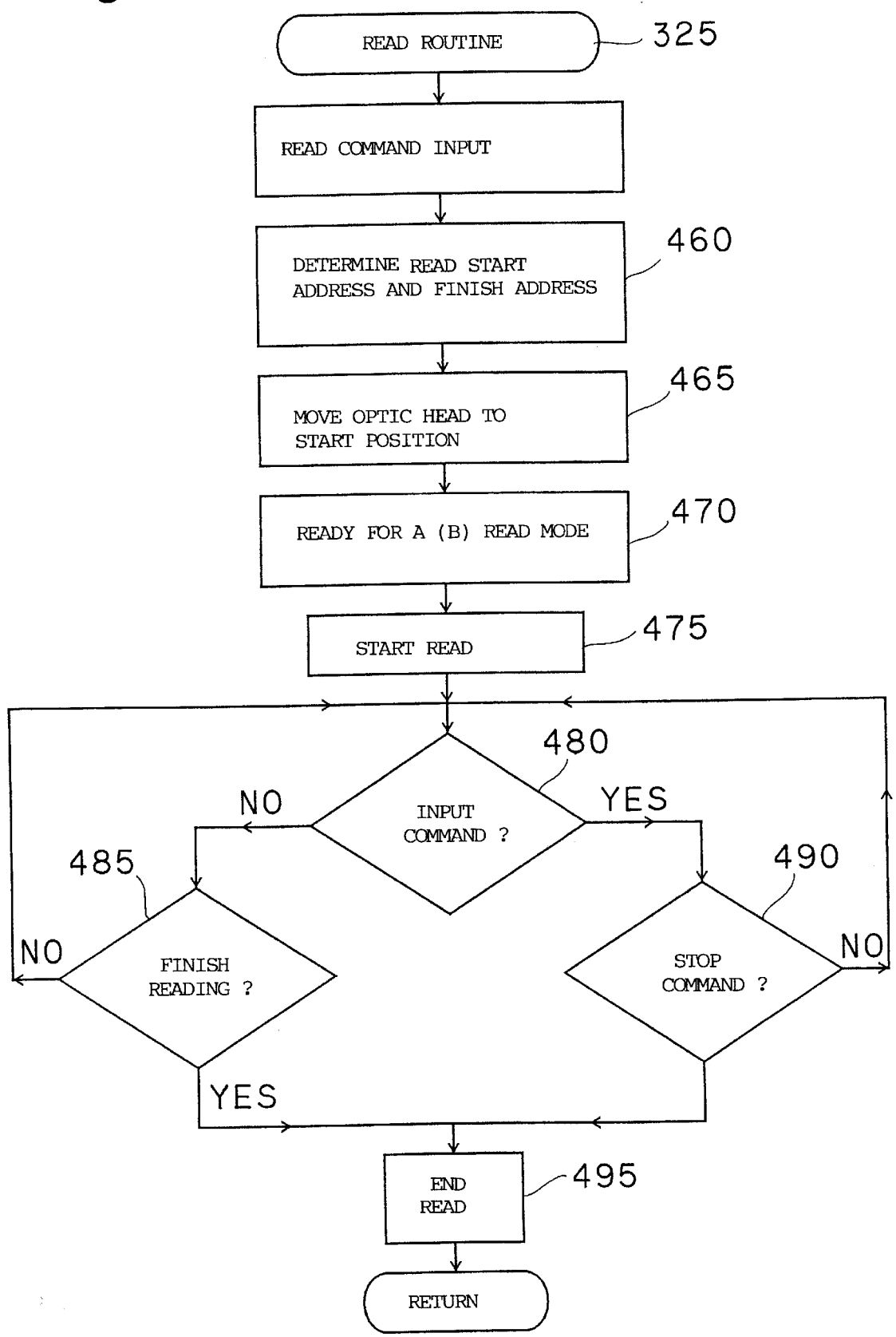
Figure 15:
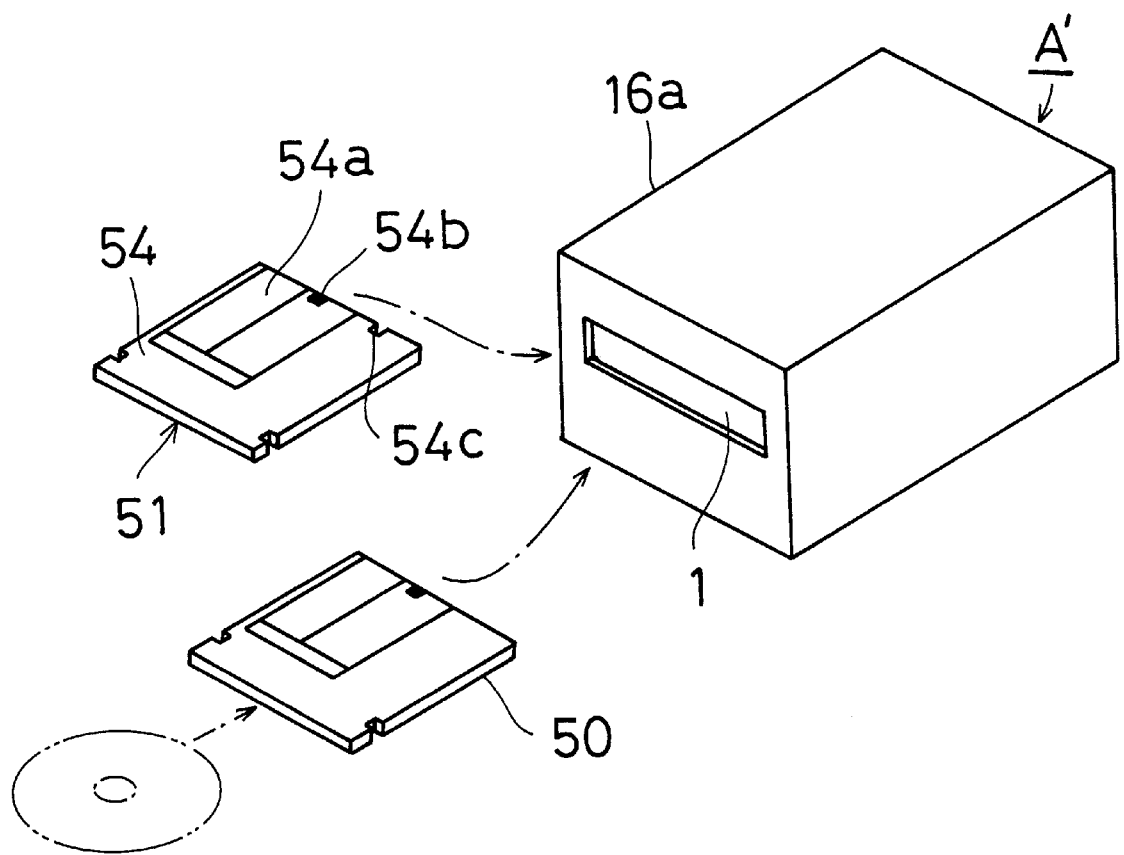
FIG. 15 is a perspective view of an optical information recording/playback device in accordance with a second embodiment of the present invention.

In either FIG. 9 or FIG. 11, if the Read Mode (325), then the operations depicted in FIG. 14 are controlled by the system controller (76). It should be noted that if the Read Mode (325) is enabled from the operations represented in FIG. 9, then the switches (74) and (75) have been previously set to complete the circuit to the A format encoder (72). Further, if the Read Mode (325) is enabled from the operations represented in FIG. 11, then the switches (74) and (75) have been previously set to complete the circuit to the B format encoder (73).

With reference to FIG. 14, the system controller (76) determines a read start and read finish address physically on the disk, at box (460). Next the optic head (13) is moved into a corresponding read position at box (465). Next the circuitry in FIG. 7 is enabled for reading at box (470). Signals are sent to the laser driver (77) in synchronization with the endec (72), as shown in box (475) to start reading.

The system controller (76) monitors the read process at decision box (480). If a stop command issues as represented in decision box (490), the system controller (76) ends the read mode (495). Returning to decision box (480), the system controller (76) monitors the read process to completion, as indicated by decision box (485). When complete, the read mode ends (495), and the system controller (76) returns to the operations depicted in either FIG. 9 or FIG. 11, depending upon where the Read Mode (325) was enabled.

A second embodiment of the present invention is depicted in FIGS. 15–19. In the second embodiment, a housing (16a) is formed with a first slot 1 into which a cartridge (50) or a cartridge (54) may be inserted. The cartridge (54) includes the disk (51). The recess (54c) as described above with respect to the first embodiment, indicates that the disk (51) is a rewriteable disk.

Many elements and features of the second embodiment depicted in FIGS. 15–19 are generally the same or identical to elements described above with respect to the first embodiment. Those elements common to both the first and second embodiments have like reference numerals. A detailed description of elements common to both the first and second embodiments is therefore not given here in great detail.

Figure 16:
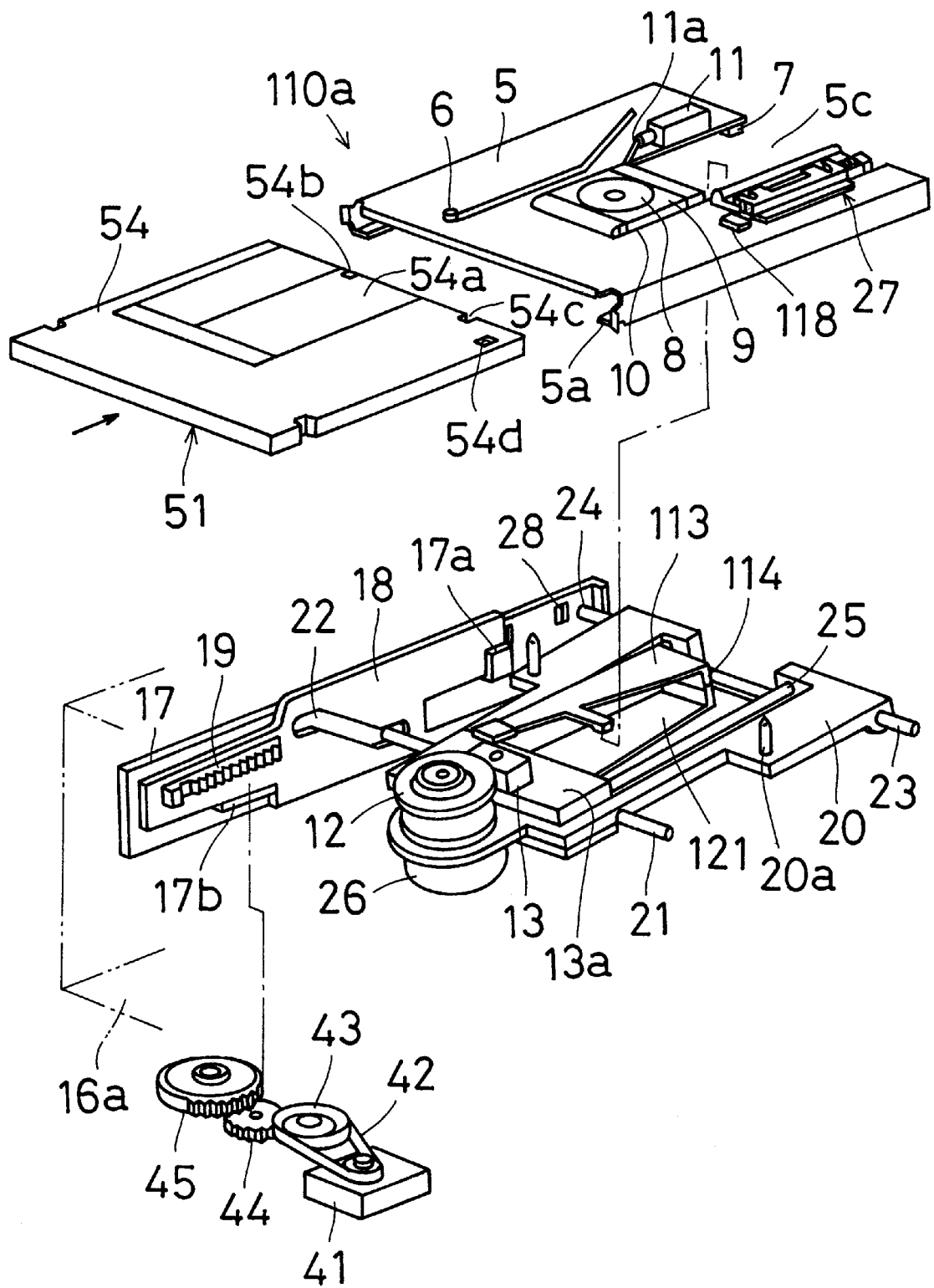
FIG. 16 is an exploded perspective view, similar to FIG. 2, showing some of the internal components of the optical information recording/playback device depicted in FIG. 15, including portions of an optical disk support mechanism, and a magnetic recording head.

As shown in FIG. 16, the device A' includes a cartridge assembly 110' that includes an upper plate (5) that is generally the same as the upper plate (5) described above with reference to the first embodiment. A magnetic head raising/lowering mechanism (27) is disposed on the upper plate (5), as is the clamper (8) of the clamp means (10). A switch (7) and a solenoid (11) are likewise positioned on the plate (5) as in the first embodiment.

The drive frame (20), shown in FIG. 16, is generally identical to the drive frame in the first embodiment, except that pins (20a) are formed on an upper surface of the drive frame (20) in the second embodiment. The pins (20a) extend through holes (54d) formed in the cartridges (54) to secure the cartridge (54) within the housing (16a).

The housing (16a) is also fitted with a motor (41), the belt (42), the belt wheel (43) and the gears (44) and (45). A gear (40) used in the first embodiment is not necessary in the second embodiment since no tray (2) is present in the second embodiment.

The slider (18) and related components such as the following shafts (21), the rack (19) and sensor (28) all have generally the same function as in the first embodiment although without the interaction with a tray (2), a tray (2) not being present in the second embodiment.

Figure 17A:
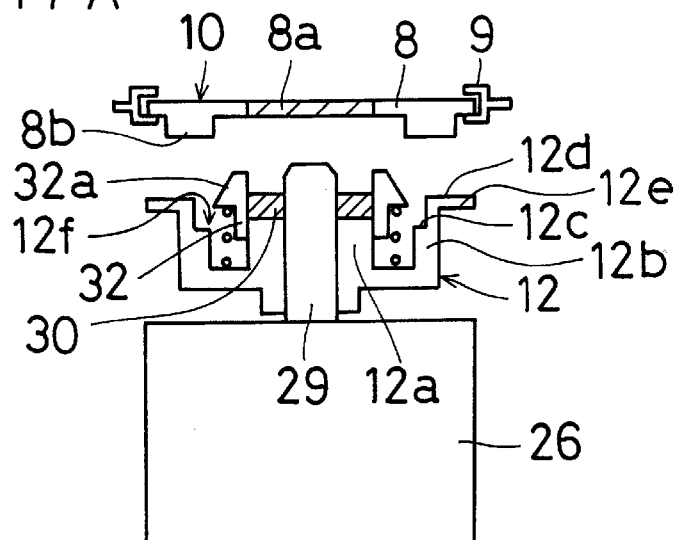
FIGS. 17a, 17b and 17c are fragmentary, cross section, schematic views showing portions of the optical disk mechanism depicted in FIG. 15, where
Figure 17B:
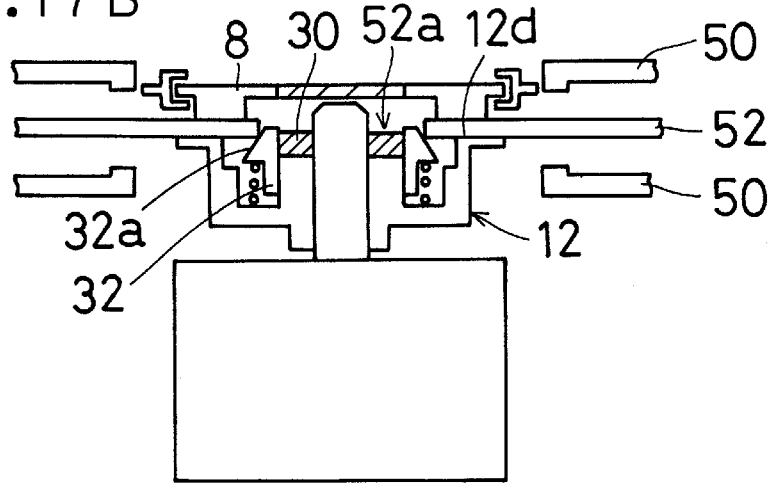
Figure 17C:
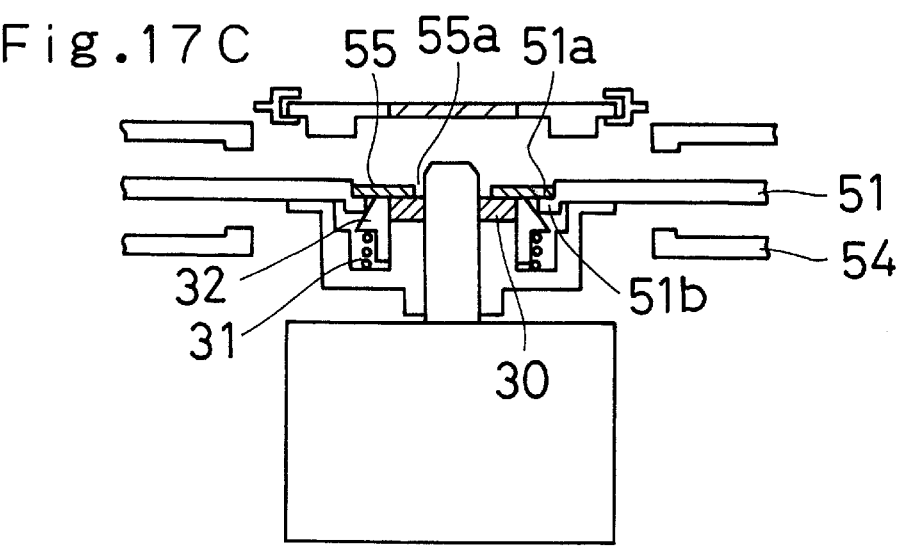

As shown in FIGS. 17a, 17b and 17c, the device (A') in accordance with the second embodiment centers and engages both types of disks, those with hubs and without hubs. The centering of disks in FIGS. 17a, 17b and 17c is generally identical to the centering described above with respect to FIGS. 4a, 4b and 4c except that the disk (52) shown in FIG. 17b is housed in the cartridge (50). Elements in FIGS. 17a, 17b and 17c with reference numerals common to FIGS. 4a, 4b and 4c are generally identical.

Figure 18A:
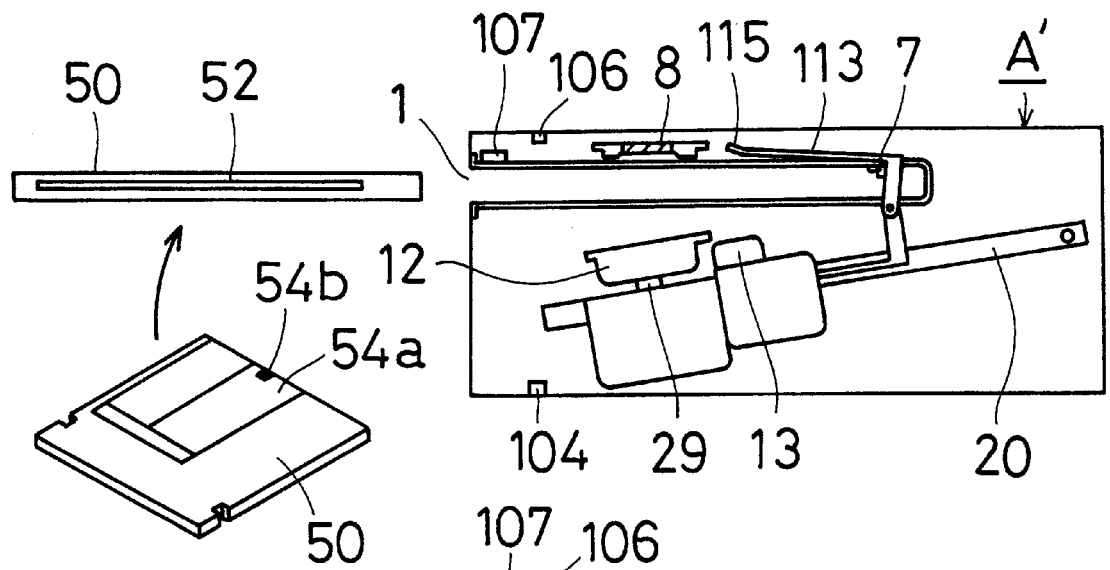
FIGS. 18a, 18b and 18c are side schematic views of the optical information recording/playback device depicted in FIG. 15, showing portions of the support mechanism depicted in FIGS. 17a, 17b and 17c, illustrating the movement of various components of the support mechanism when a cartridge housed optical disk is installed in the optical information recording/playback device where the optical disk is not configured for recording, but for reading only, and the magnetic head as shown in FIG. 18c is prevented from engaging the reading only optical disk.
Figure 18B:
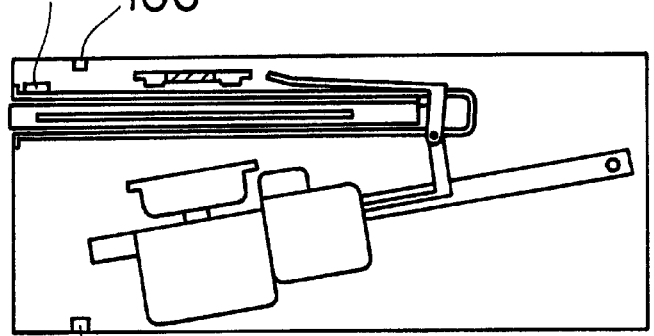
Figure 18C:
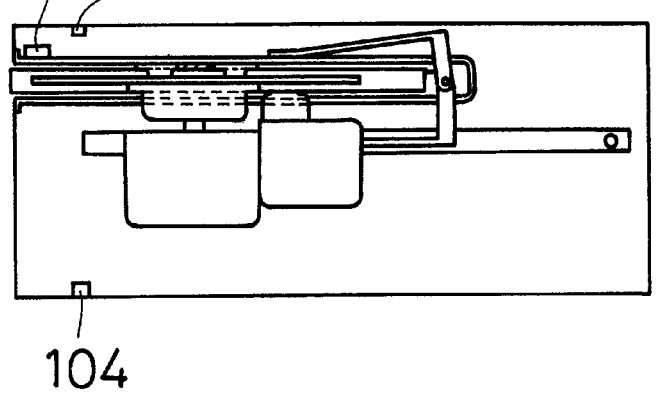

With reference now to FIGS. 18a, 18b and 18c, the operation of installing and centering a disk is depicted and is very similar to the operations described above with respect to FIGS. 6a, 6b and 6c with at least three exceptions. First, there is not tray in the second embodiment: depicted in FIGS. 15–19. Second, the disk (52) housed in the cartridge (50) shown in FIGS. 18a, 18b and 18c does not have a hub, but rather is formed with a centering hole (52a). Therefore, the clapper (8) is lowered to engage the disk (52). Third, the presence of a hub in a disk must be determined with the disk housed in a cartridge (50). Determination of the presence of a hub is similar to that described above with reference to the first embodiment. Specifically, the housing (A') is provided with the sensors (104) and (106). Movement of the cartridge as it is installed into the housing (16a) is monitored by a movement monitoring device (107) which may be a wheel that engages the cartridge (50) as the cartridge (50) is inserted into the first slot (1) or other similar movement monitoring device. The movement monitoring device (107) is connected to the system controller (76) at the box marked "other" in FIG. 7, such that a movement verse sensor output signal may be generated, as depicted in FIGS. 8a and 8b, so that the presence of a hub may be determined by the system controller. If a hub is not detected, the clamper (8) is lowered into contact with the disk (52). If a hub is detected, then the clamper (8) remains in a retracted, upper position as shown in FIG. 19c.

Figure 19A:
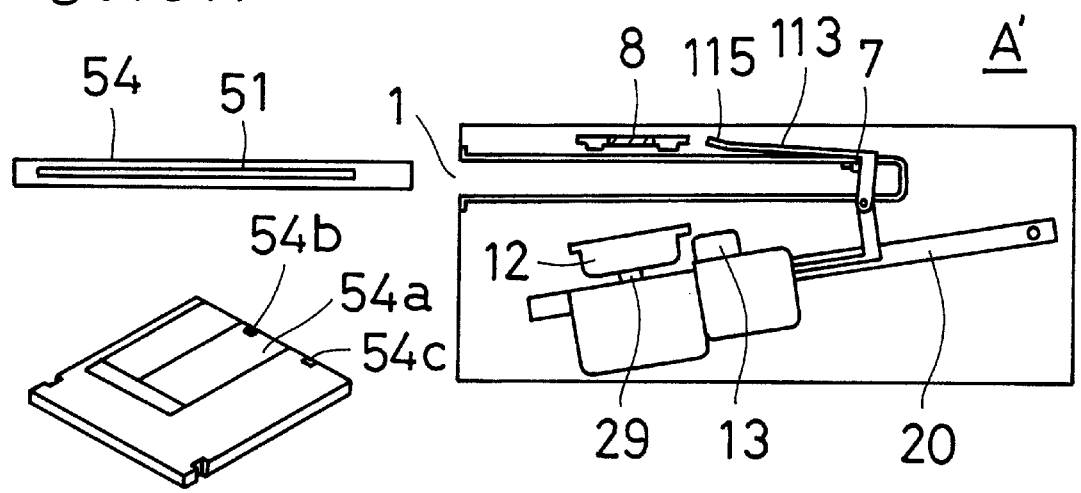
FIGS. 19a, 19b and 19c are side schematic views similar to FIGS. 18a, 18b and 18c illustrating the movement of various components of the support mechanism when a cartridge housed optical disk is installed in the optical information recording/playback device where the optical disk is configured for recording, and in FIG. 19c the magnetic head engages the optical disk for recording information thereon.
Figure 19B:
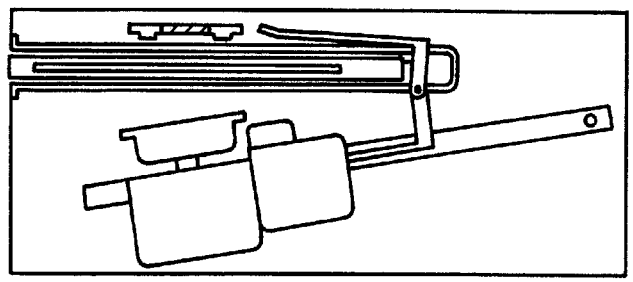
Figure 19C:
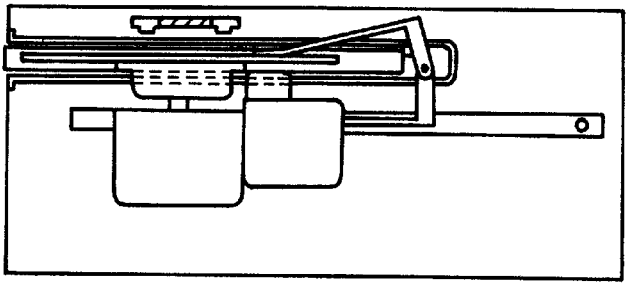
Figure 20:
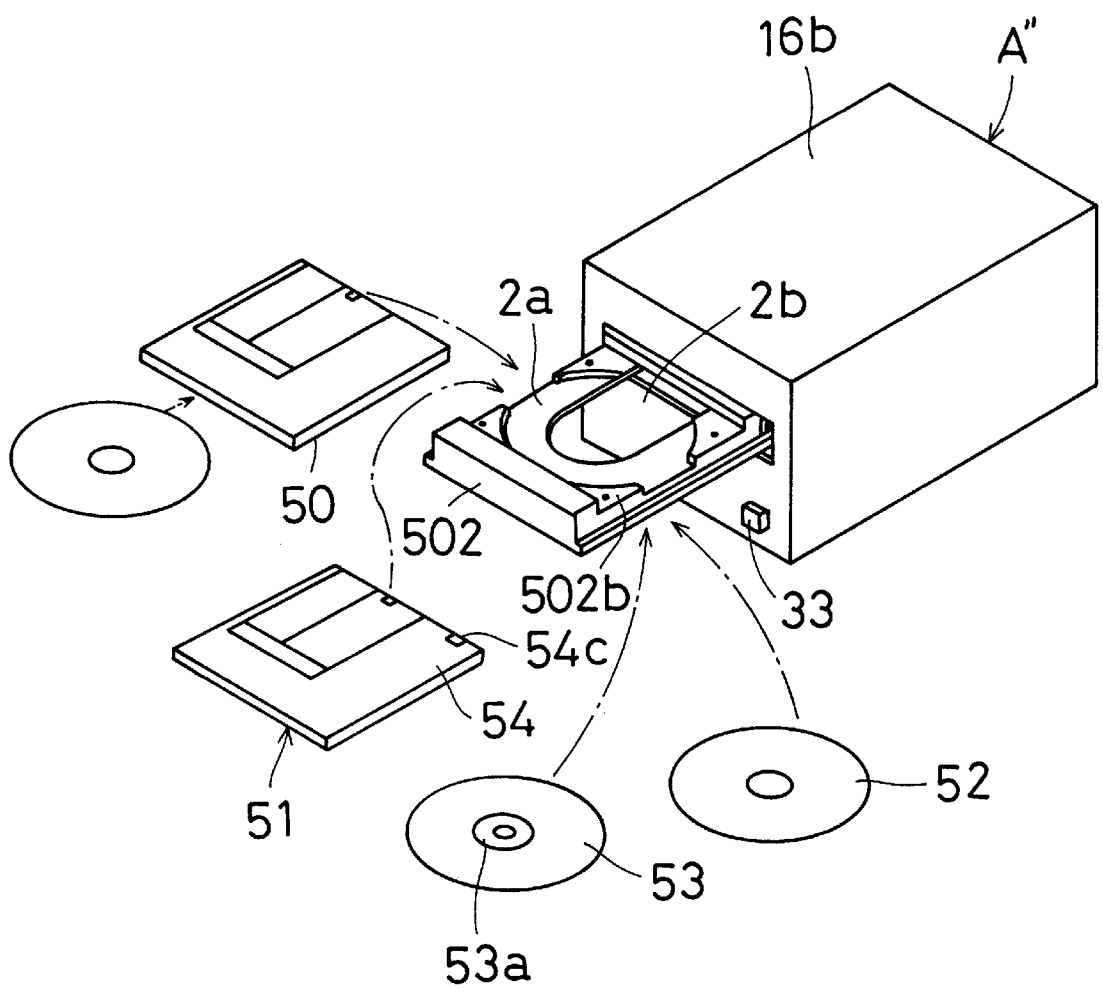
FIG. 20 is a perspective view of an optical information recording/playback device in accordance with a third embodiment of the present invention.

The operations depicted in FIGS. 19a, 19b and 19c indicate movement of various components when a cartridge (54) with a rewriteable disk (51) is inserted into the slot (1). Since the general operation and movements of the various parts has been described above with respect to the first embodiment, further description is unnecessary. It should also be appreciated, that although not shown, the second embodiment includes a magnetic head (115) and related components, but are not shown to provide greater clarity in the figures.

Figure 21:
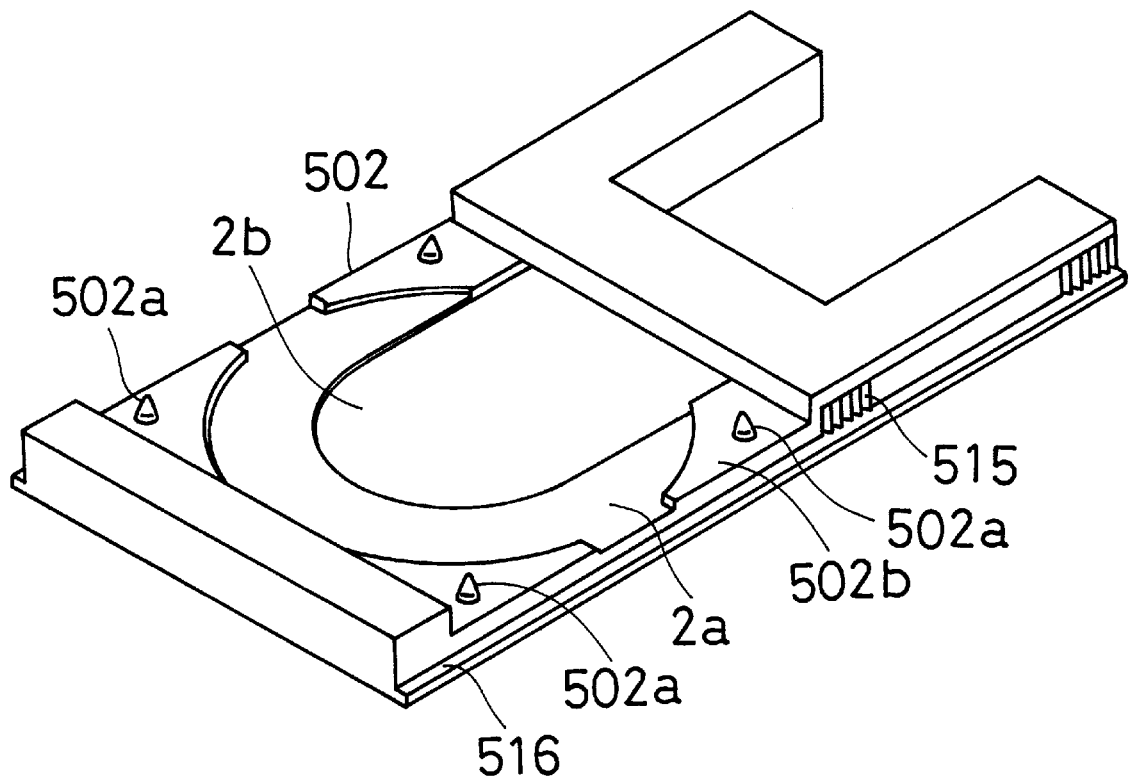
FIG. 21 is a fragmentary perspective view of a tray of the optical information recording/playback device depicted in FIG. 20, the tray being formed to accommodate various configurations of optical disks, both with and without cartridge housings.

A third embodiment of the present invention is depicted in FIGS. 20–24. In the third embodiment, a device (A") shown in FIG. 20 includes a housing (16b) which is formed with a single slot, specifically slot (3) through which a tray (502) may extend. The tray (502) is formed with a disk recess (2a), a U-shaped opening (2b) four cartridge retainers (502a) which extend upwardly, and a cartridge retaining surface (502b), as shown in FIG. 21. The tray (502) is further formed with a rack (515) having gear teeth formed thereon for engagement with a gear and motor (not shown) which effect retracting and extending of the tray (502). The tray is also formed with a lip (516) formed on each side that engages a groove (not shown) formed in the housing (16").

Figure 22:
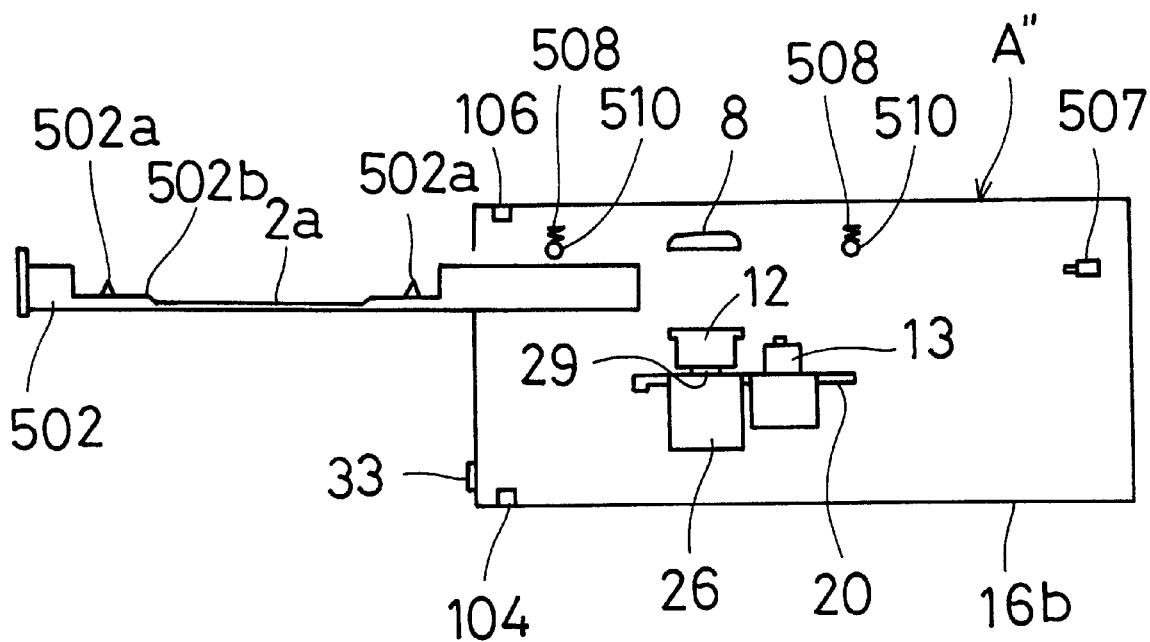
FIG. 22 is a schematic side view showing portions of an optical disk support mechanism employed in the recording/playback device depicted in FIG. 20, and the tray depicted in FIG. 21, the tray shown in an extended or open position and where the magnetic head and related members are not shown to provide greater clarity.

With reference now to FIG. 22, the housing (16b) includes a sensor (507) for determining whether or not the tray (502) is in the retracted position or not. The motor (26) is mounted on a drive frame (20) which is only partially shown in FIG. 22. Within the housing (16b) springs (508) and detentes (510) are provided for engagement with a cartridge when installed in the tray (502).

As with the second embodiment, there are many elements in the third embodiment generally the same or identical with elements in the first embodiment. Therefore it is not necessary to describe those like elements again.

Figure 23A:
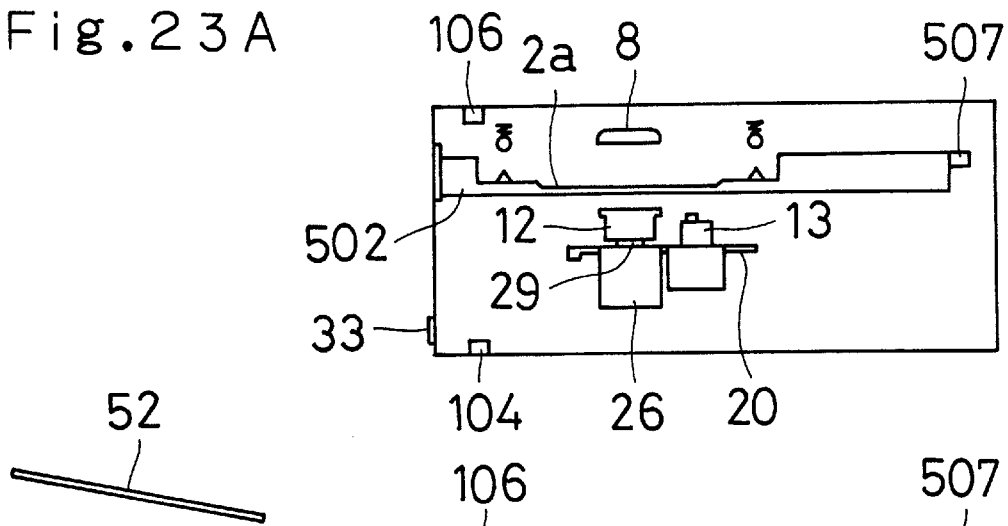
FIGS. 23a, 23b, 23c and 23d are side schematic views of the optical information recording/playback device depicted in FIGS. 20 and 22, showing portions of the support mechanism and tray in various positions in response to an optical disk being installed in the optical information recording/playback device, where the optical disk is not housed in a protective cartridge and where the magnetic head and related members are not shown to provide greater clarity.
Figure 23B:
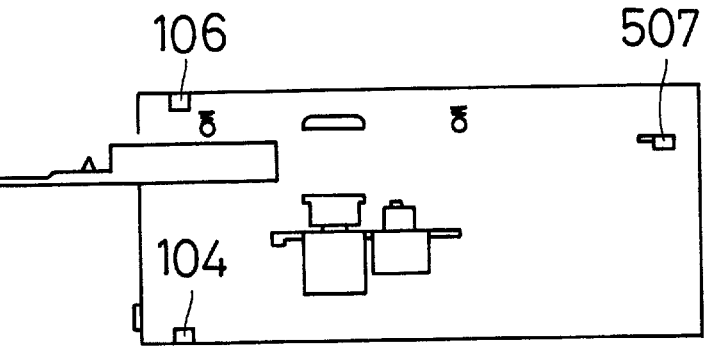
Figure 23C:
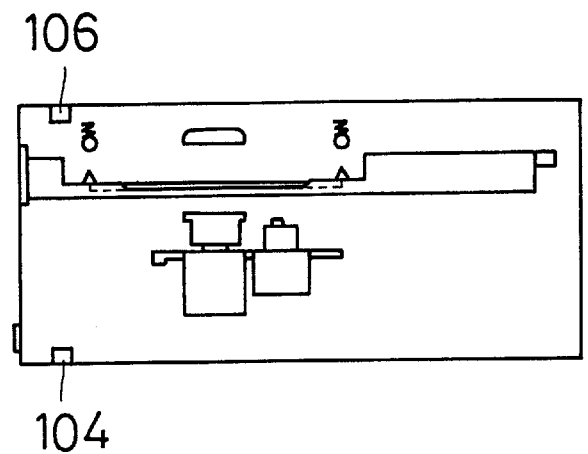
Figure 23D:
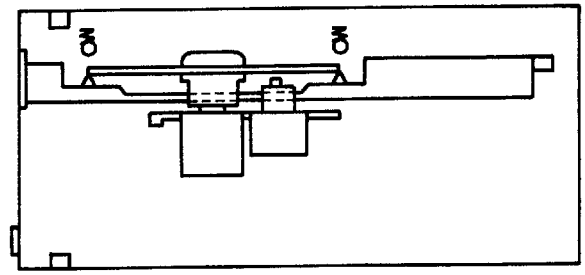
Figure 24A:
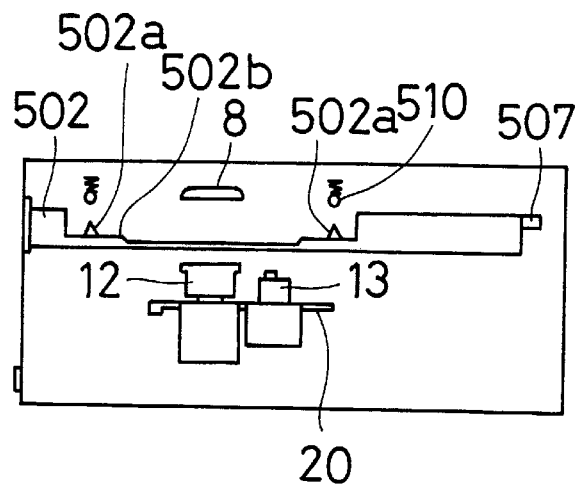
FIGS. 24a, 24b, 24c and 24d are side schematic views of the optical information recording/playback device depicted in FIGS. 20 and 22, showing portions of the support mechanism and tray in various positions in response to an optical disk being installed in the optical information recording/playback device, where the optical disk is housed in a protective cartridge and where the magnetic head and related members are not shown to provide greater clarity.
Figure 24B:
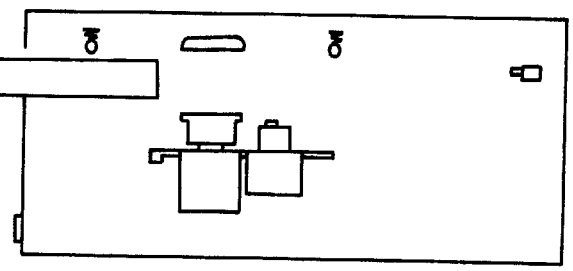
Figure 24C:
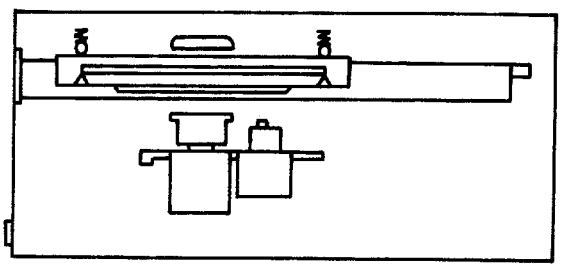
Figure 24D:
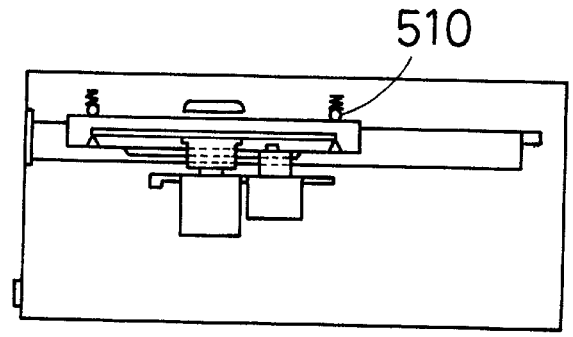

With reference now to FIGS. 23a, 23b, 23c and 23d, the third embodiment is shown with an unhoused disk (52) being installed in the device (A"). If a hub is detected from the output from the sensor (106) the clamper (8) remains in an upper position. However, if no hub is detected, the clamper (8) is lowered to contact the disk (52) as shown in FIG. 23d.

With reference now to FIG. 24a, 24b, 24c and 24d, the third embodiment is shown with a cartridge (54) having a disk (51) being installed in the device (A"). The pins (502a) fit into corresponding holes (not shown) formed in the cartridge (54) for aligning the cartridge (54) on the tray (502). Once the tray (502) has been retracted into the housing (16b), the detentes (510) engage the cartridge (54) from above, thus securing the cartridge (54) in place on the tray (502). In the example illustrated in FIG. 24a, 24b, 24c cnd 24d, the disk (51) is formed with a hub, therefore, the clamper (8) remains in a retracted position well above the disk (51) and the cartridge (54). If a hub is not detected from the output from the sensor (106) and the tray is retracted into the housing (16b), then the clamper (8) is lowered to contact the disk without a hub.

Although not shown in FIGS. 20–24, the third embodiment may also be provided with a magnetic recording head and means for determining whether a rewriteable disk is installed.

Generally, the operations of both the second and third embodiments are similar in nature to the operations of the first embodiment described above. Indeed, the subroutines and operations of the second and third embodiments are merely slightly simplified compared to the operations of the first embodiment. Therefore, a description of the operations of the second and third embodiments is not necessary.

The present invention is constructed as described in detail above, and it has the following advantages.

By providing a tray for unhoused optical information recording media, a cartridge holder for cartridges housing optical information recording media, a center shaft which rotates by means of a rotational drive means, and a support mechanism including a turntable which is provided with a magnetic body, an optical information recording medium centering means and a support surface which supports optical information recording media, and which turntable is secured to the center shaft, and a clamp means which can be brought into contact with and separated from the support surface and which maintains in contact with the support surface of the turntable optical information recording media which do not have hubs, it is possible to perform recording and/or playback of any read-only type, direct read after write type or rewriteable optical information recording media using a single optical information recording/playback device, with the drive means and expensive optical head and the like used in common, irrespective of differences in specification such as centering method and clamping method, and irrespective of whether or not the medium is housed in a cartridge. It is thus possible to provide a single optical information recording/playback device which is inexpensive and economic in terms of space, and which can thus cope with multimedia requirements. Thus a single optical information recording/playback device can cope with unhoused optical information recording media which do or do not have hubs, and optical information recording media which are housed in a cartridge and do or do not have hubs, and thus the device is convenient for the user.

With optical information recording media which do not have a hub in the center hole, the center hole of the optical information recording medium is automatically centered to high accuracy following the conical outer surface of a cylindrical member, the optical information recording medium is maintained in contact with the support surface of the turntable by means of the magnetic attractive force between the magnetic body of the clamper and the magnetic body which is concentric with the center shaft, and with optical information recording media which do have hubs, the center hole of the hub is automatically centered to high accuracy following the conical outer surface of the cylindrical member, the hub pushes the cylindrical member down and is magnetically held by means of the magnetic attractive force between the hub and a magnetic object on the upper surface of the turntable, and thus satisfactory recording and/or playback can be performed without recording and/or playback errors or the like.

Since unhoused optical information recording media are housed in a cartridge and installed in the optical information recording/playback device, and recording and/or playback is then performed, hand dirt, fingerprints or dust and the like are prevented from becoming attached to the surface of the optical information recording medium, and furthermore transfer of foreign bodies to the surface of the optical information recording medium during recording and/or playback is prevented, and it is thus possible to avoid unsatisfactory recording and/or playback of information.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. An optical disk recording/playback device, comprising:
    a housing having a first generally vertical face, said face being formed with an opening;
    a cartridge holder disposed in said housing adjacent to said opening for retaining an optical disk disposed in a cartridge, the cartridge being insertable through said opening;
    a turntable disposed under said cartridge holder in said housing, said turntable configured to center and retain the optical disk disposed in the cartridge in response to insertion of the cartridge in said cartridge holder, said turntable comprising:
        a motor having a shaft;
        an annular support member connected to said shaft, said annular support member formed with a tapered conical surface, said annular support member being spring biased away from said motor such that said tapered conical surface is engagable with a center portion of the optical disk;
        a magnetic body centered in said annular support member;
        a clamp means selectively engagable with the optical disk in response to a signal from a system controller; and
        wherein said motor is supported for pivotal movement within said housing for movement from a disk-disengaged position to a disk-engagement position in response to insertion of the cartridge into said cartridge holder;
    a first sensing means for sensing the presence of the optical disk in said cartridge holder;
    a second sensing means for determining the type of optical disk in said cartridge holder;
    optical data reading means disposed in said housing for reading data stored on the optical disk inserted in said cartridge holder;
    an optical data recording head connected for movement with said optical data reading means for recording data on the optical disk inserted into said cartridge holder;
    system controller electronically connected to said optical data reading means and said first and second sensing means, said system controller:
        (a) determining an encoding format of the optical disk inserted into said cartridge holder in response to sensing by said second sensing means,
        (b) reading encoded data from the optical disk inserted into said housing using said optical data reading means using an encoding format determined in (a);
        (c) determining whether the optical disk inserted into said cartridge holder is a rewriteable optical disk,
        (d) recording data on said optical disk using said optical data recording head in response to (c) determining the optical disk inserted into said cartridge holder is a rewriteable disk.

2. The optical disk recording/playback device, as set forth in claim 1, wherein said first sensing means comprises:
    a first sensor disposed in said cartridge holder configured to sense a presence of the cartridge in said cartridge holder; and wherein
    said system controller is configured to operate said turntable in response to an output from said first sensor.

3. The optical disk recording/playback device, as in claim 1, further comprising:
    a light emitting sensor and a light detecting sensor disposed on opposing sides of said cartridge holder and connected electronically to said system controller for determining the presence of a hub on the optical disk;

wherein said system controller is further configured to measure a time period corresponding to movement of the optical disk in said cartridge holder as the optical disk undergoes movement with respect to the housing, and said system controller determining the presence of a hub in response to length of said time period.

4. The optical disk recording/playback as set forth in claim 1, wherein said clamp means comprises a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub.

5. The optical disk recording/playback as set forth in claim 4, wherein said support plate is movable from said upper disengaged position to said lower engaged position within said housing in response to the one of the optical disks formed without a hub being inserted into said housing.

6. The optical disk recording/playback as set forth in claim 4, further comprising a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

7. An optical disk recording/playback device, comprising:
    a housing having a first generally vertical face, said face being formed with generally parallel, horizontally extending first and second openings;
    a cartridge holder disposed in said housing adjacent to said first opening for retaining an optical disk disposed in a cartridge, the cartridge being insertable through said first opening;
    a retractable tray on which a bare optical disk is insertable, said cartridge holder and said tray being arranged adjacent to one another and parallel to one another with respect to a vertical direction with said tray positioned within said housing, said retractable tray being configured to selectively extend through said second opening;
    a turntable disposed under said retractable tray in said housing, said turntable configured to center and retain the optical disk disposed in the cartridge in response to insertion of the cartridge into said cartridge holder, said turntable also configured to center and retain the bare optical disk in response to insertion of the bare optical disk onto said retractable tray, said turntable comprising:
        a motor having a shaft;
        an annular support member connected to said shaft, said annular support member formed with a tapered conical surface, said annular support member being spring biased away from said motor such that said tapered conical surface is engagable with a center portion of one of the optical disks;
        a magnetic body centered in said annular support member;
        a clamp means selectively engagable with one of the optical disks in response to a signal from a system controller; and
        wherein said motor is supported for pivotal movement within said housing for movement from a disk-disengaged position to a disk-engagement position in response to insertion of one of the optical disks;
    a first sensing means for sensing the presence of one of the optical disks in said housing;
    a second sensing means for determining the type of optical disk inserted into said housing;
    optical data reading means disposed in said housing for reading data stored on the optical disk inserted in said housing;
    an optical data recording head connected for movement with said optical data reading means for recording data on the optical disk inserted into said housing;
    system controller electronically connected to said optical data reading means and said first and second sensing means, said system controller:
        (a) determining an encoding format of the optical disk inserted into said housing in response to sensing by said second sensing means,
        (b) reading encoded data from the optical disk inserted into said housing using said optical data reading means using an encoding format determined in (a);
        (c) determining whether the optical disk inserted into said housing is a rewriteable optical disk,
        (d) recording data on said optical disk using said optical data recording head in response to (c) determining the optical disk inserted into said housing is a rewriteable disk.

8. The optical disk recording/playback device, as set forth in claim 7, wherein said first sensing means comprises:
    a first sensor disposed in said cartridge holder configured to sense a presence of the cartridge in said cartridge holder;
    a second sensor disposed in said tray for sensing the presence of the bare optical disk on said tray; and wherein
    said system controller is configured to operate said turntable in response to an output from one of said first and second sensors.

9. The optical disk recording/playback device, as in claim 7, wherein said tray includes a mechanical apparatus for selectively extending said tray partially out of said housing and for retracting said tray into said housing through said second opening, said tray formed with an annular recess configured to receive CD-ROM disks and audio CDs.

10. The optical disk recording/playback device, as in claim 7, further comprising:
    a light emitting sensor and a light detecting sensor disposed on opposing sides of said retractable tray and said cartridge holder and, connected electronically to said system controller for determining the presence of a hub on the optical disk;
    wherein said system controller is further configured to measure a time period corresponding to movement of the optical disk in one of said retractable tray and said cartridge holder as the optical disk undergoes movement with respect to the housing, and said system controller determining the presence of a hub in response to length of said time period.

11. The optical disk recording/playback as set forth in claim 7, wherein said clamp means comprises a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub.

12. The optical disk recording/playback as set forth in claim 11, wherein said support plate is movable from said upper disengaged position to said lower engaged position within said housing in response to the one of the optical disks formed without a hub being inserted into said housing.

13. The optical disk recording/playback as set forth in claim 11, further comprising a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

14. An optical disk recording/playback device, comprising:
   a housing having a face formed with an opening;
   a tray supported by said housing, said tray being retractable from an open position where said tray at least partially extends out of said opening in said housing and to a closed position where said tray is retracted within said housing, said tray formed with a recess to receive a bare optical disk, said recess having a diameter generally corresponding to the bare optical disk, said tray also formed with a plurality of cartridge setting pins for receiving and retaining an optical disk disposed in a cartridge, said cartridge setting pins being formed on said tray radially outward from the diameter of said recess such that the cartridge is positionable over said recess;
   a turntable supported within said housing, said turntable being configured to center and retain one of the bare optical disk and the optical disk within the cartridge in response to one of the bare optical disk and the optical disk in the cartridge being received in said housing, said turntable comprising:
      a motor having a shaft;
      an annular support member connected to said shaft, said annular support member formed with a tapered conical surface, said annular support member being spring biased away from said motor such that said tapered conical surface is engagable with a center portion of one of the optical disks;
      a magnetic body centered in said annular support member;
      a clamp means selectively engagable with the optical disk in response to a signal from a system controller; and
      wherein said motor is supported for pivotal movement within said housing for movement from a disk-disengaged position to a disk-engagement position in response to insertion of one of the optical disks;
   a first sensor disposed in said housing configured to sense a presence of the cartridge in said tray;
   a second sensor disposed in said tray for sensing the presence of the bare optical disk on said tray;
   a third sensor disposed in said housing for sensing writeablity of the optical disk in the cartridge;
   optical data reading means disposed in said housing for reading data stored on one of the optical disk in the cartridge and the bare optical disk;
   an optical data recording head connected for movement with said optical data reading means for recording data on the optical disk disposed in said housing;
   system controller electronically connected to said optical data reading means and said first, second and third sensors, said system controller:
      (a) determining an encoding format of the optical disk disposed in said tray in response to sensing by one of said first and second sensors,
      (b) reading encoded data from the optical disk using said optical data reading means using an encoding format determined in (a);
      (c) determining whether the optical disk is a rewriteable optical disk in response to sensing by said third sensor,
      (d) recording data on the optical disk using said optical data recording head in response to (c) determining said optical disk is a rewriteable disk; and wherein
   said system controller is configured to operate said turntable in response to sensing of one of said first and second sensors.

15. The optical disk recording/playback device, as in claim 14, further comprising:
   a light emitting sensor and a light detecting sensor disposed on opposing sides of said retractable tray and connected electronically to said system controller for determining the presence of a hub on the optical disk;
   wherein said system controller is further configured to measure a time period corresponding to movement of the optical disk in said retractable tray as the optical disk undergoes movement with respect to the housing, and said system controller determining the presence of a hub in response to a length of said time period.

16. The optical disk recording/playback as set forth in claim 14, wherein said clamp means comprises a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub.

17. The optical disk recording/playback as set forth in claim 16, wherein said support plate is movable from said upper disengaged position to said lower engaged position within said housing in response to the one of the optical disks formed without a hub being insetted into said housing.

18. The optical disk recording/playback as set forth in claim 16, further comprising, a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

19. An optical disk recording/playback device, comprising:
   a housing having a first generally vertical face, said face being formed with an opening;
   a cartridge holder disposed in said housing adjacent to said opening for retaining an optical disk disposed in a cartridge, the cartridge being insertable through said opening;

a turntable disposed under said cartridge holder in said housing, said turntable configured to center and retain the optical disk disposed in the cartridge in response to insertion of the cartridge in said cartridge holder, said turntable comprising:

a motor having a shaft;

an annular support member connected to said shaft, said annular support member formed with a tapered conical surface, said annular support member being spring biased away from said motor such that said tapered conical surface is engagable with a center portion of the optical disk;

a magnetic body centered in said annular support member;

a clamp means selectively engagable with the optical disk in response to a signal from a system controller, said clamp means comprises a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub;

wherein said motor is supported for pivotal movement within said housing for movement from a disk-disengaged position to a disk-engagement position in response to insertion of the cartridge into said cartridge holder;

a first sensing means for sensing the presence of the optical disk in said cartridge holder;

a second sensing means for determining the type of optical disk in said cartridge holder;

optical data reading means disposed in said housing for reading data stored on the optical disk inserted in said cartridge holder;

an optical data recording head connected for movement with said optical data reading means for recording data on the optical disk inserted into said cartridge holder; and a system controller electronically connected to said optical data reading means and said first and second sensing means.

20. The optical disk recording/playback as set forth in claim 19, wherein said support plate is movable from said upper disengaged position to said lower engaged position within said housing in response to the one of the optical disks formed without a hub being inserted into said housing.

21. The optical disk recording/playback as set forth in claim 20, further comprising a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

22. The optical disk recording/playback as set forth in claim 21, wherein said system controller comprises means for:

(a) determining an encoding format of the optical disk inserted into said cartridge holder in response to sensing by said second sensing means, (b) reading encoded data from the optical disk inserted into said housing using said optical data reading means using an encoding format determined in (a);

(c) determining whether the optical disk inserted into said cartridge holder is a rewriteable optical disk, (d) recording data on said optical disk using said optical data recording head in response to (c) determining the optical disk inserted into said cartridge holder is a rewriteable disk.

23. The optical disk recording/playback device, as set forth in claim 22, wherein said first sensing means comprises:

a first sensor disposed in said cartridge holder configured to sense a presence of the cartridge in said cartridge holder; and wherein said system controller is configured to operate said turntable in response to an output from said first sensor.

24. The optical disk recording/playback device, as in claim 23, further comprising:

a light emitting sensor and a light detecting sensor disposed on opposing sides of said cartridge holder and connected electronically to said system controller for determining the presence of a hub on the optical disk;

wherein said system controller is further configured to measure a time period corresponding to movement of the optical disk in said cartridge holder as the optical disk undergoes movement with respect to the housing, and said system controller determining the presence of a hub in response to length of said time period.

25. An optical disk recording/playback device, comprising:

a housing having a first generally vertical face, said face being formed with generally parallel, horizontally extending first and second openings;

a cartridge holder disposed in said housing adjacent to said first opening for retaining an optical disk disposed in a cartridge, the cartridge being insertable through said first opening;

a retractable tray on which a bare optical disk is insertable, said cartridge holder and said tray being arranged adjacent to one another and parallel to one another with respect to a vertical direction with said tray positioned within said housing, said retractable tray being configured to selectively extend through said second opening;

a turntable disposed under said retractable tray in said housing, said turntable configured to center and retain the optical disk disposed in the cartridge in response to insertion of the cartridge into said cartridge holder, said turntable also configured to center and retain the bare optical disk in response to insertion of the bare optical disk onto said retractable tray, said turntable comprising:

a motor having a shaft;

an annular support member connected to said shaft, said annular support member formed with a tapered conical surface, said annular support member being spring biased away from said motor such that said tapered conical surface is engagable with a center portion of one of the optical disks, a magnetic body centered in said annular support member;

a clamp means selectively engagable with one of the optical disks in response to a signal from a system controller, said clamp means having a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub; and wherein said motor is supported for pivotal movement within said housing for movement from a disk-disengaged position to a disk-engagement position in response to insertion of one of the optical disks;

a first sensing means for sensing the presence of one of the optical disks in said housing;

a second sensing means for determining the type of optical disk inserted into said housing;

optical data reading means disposed in said housing for reading data stored on the optical disk inserted in said housing;

an optical data recording head connected for movement with said optical data reading means for recording data on the optical disk inserted into said housing;

system controller electronically connected to said optical data reading means and said first and second sensing means.

26. The optical disk recording/playback as set forth in claim 25, wherein said support plate is movable from said upper disengaged position to said lower engaged position within said housing in response to the one of the optical disks formed without a hub being inserted into said housing.

27. The optical disk recording/playback as set forth in claim 26, further comprising a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

28. The optical disk recording/playback as set forth in claim 27, wherein said system controller includes means for:
(a) determining an encoding format of the optical disk inserted into said housing in response to sensing by said second sensing means,
(b) reading encoded data from the optical disk inserted into said housing using said optical data reading means using an encoding format determined in (a);
(c) determining whether the optical disk inserted into said housing is a rewriteable optical disk,
(d) recording data on said optical disk using said optical data recording head in response to (c) determining the optical disk inserted into said housing is a rewriteable disk.

29. The optical disk recording/playback device, as set forth in claim 28, wherein said first sensing means comprises:
a first sensor disposed in said cartridge holder configured to sense a presence of the cartridge in said cartridge holder;
a second sensor disposed in said tray for sensing the presence of the bare optical disk on said tray; and
wherein said system controller is configured to operate said turntable in response to an output from one of said first and second sensors.

30. The optical disk recording/playback device, as in claim 29, wherein said tray includes a mechanical apparatus for selectively extending said tray partially out of said housing and for retracting said tray into said housing through said second opening, said tray formed with an annular recess configured to receive CD-ROM disks and audio CDs.

31. The optical disk recording/playback device, as in claim 30, further comprising:
a light emitting sensor and a light detecting sensor disposed on opposing sides of said retractable tray and said cartridge holder and connected electronically to said system controller for determining the presence of a hub on the optical disk;
wherein said system controller is further configured to measure a time period corresponding to movement of the optical disk in one of said retractable tray and said cartridge holder as the optical disk undergoes movement with respect to the housing, and said system controller determining the presence of a hub in response to length of said time period.

32. An optical disk recording/playback device, comprising:
a housing having a face formed with an opening;
a tray supported by said housing, said tray being retractable from an open position where said tray at least partially extends out of said opening in said housing and to a closed position where said tray is retracted within said housing, said tray formed with a recess to receive a bare optical disk, said recess having a diameter generally corresponding to the bare optical disk, said tray also formed with a plurality of cartridge setting pins for receiving and retaining an optical disk disposed in a cartridge, said cartridge setting pins being formed on said tray radially outward from the diameter of said recess such that the cartridge is positionable over said recess;
a turntable supported within said housing, said turntable being configured to center and retain one of the bare optical disk and the optical disk within the cartridge in response to one of the bare optical disk and the optical disk in the cartridge being received in said housing, said turntable comprising:
a motor having a shaft;
an annular support member connected to said shaft, said annular support member formed with a tapered conical surface, said annular support member being spring biased away from said motor such that said tapered conical surface is engagable with a center portion of one of the optical disks;
a magnetic body centered in said annular support member;
a clamp means selectively engagable with the optical disk in response to a signal from a system controller, said clamp means having a disk-shaped clamper which is supported on a support plate above said shaft within said housing, said support plate being selectively movable between an upper disengaged position and a lower engaged position within said housing, said clamper being formed with an annular projection for engagement with the center portion of one of the optical disks, said clamper further being formed with a magnetic portion, said clamper being rotatable with respect to said support plate generally concentrically with said shaft, said clamper being selectively engagable with one of the optical disks formed without a hub; and wherein said motor is supported for pivotal movement within said housing for movement from a disk-disengaged position to a disk-engagement position in response to insertion of one of the optical disks;

a first sensor disposed in said housing configured to sense a presence of the cartridge in said tray;

a second sensor disposed in said tray for sensing the presence of the bare optical disk on said tray;

a third sensor disposed in said housing for sensing writeablity of the optical disk in the cartridge;

optical data reading means disposed in said housing for reading data stored on one of the optical disk in the cartridge and the bare optical disk;

an optical data recording head connected for movement with said optical data reading means for recording data on the optical disk disposed in said housing;

system controller electronically connected to said optical data reading means and said first, second and third sensors.

33. The optical disk recording/playback as set forth in claim 32, wherein said support plate is movable from said upper disengaged position to said lower engaged position within said housing in response to the one of the optical disks formed without a hub being inserted into said housing.

34. The optical disk recording/playback as set forth in claim 33, further comprising a solenoid supported in said housing, said solenoid being electronically controlled by said system controller and a shaft of said solenoid being connected to said support plate such that in response to activation of said solenoid by said system controller said clamper moves from said upper disengaged position to said lower engaged position within said housing.

35. The optical disk recording/playback as set forth in claim 34, wherein said system controller comprises means for:

(a) determining an encoding format of the optical disk disposed in said tray in response to sensing by one of said first and second sensors, (b) reading encoded data from the optical disk using said optical data reading means using an encoding format determined in (a);

(c) determining whether the optical disk is a rewriteable optical disk in response to sensing by said third sensor, (d) recording data on the optical disk using said optical data recording head in response to (c) determining said optical disk is a rewriteable disk; and wherein said system controller is configured to operate said turntable in response to sensing of one of said first and second sensors.

36. The optical disk recording/playback device, as in claim 35, further comprising:

a light emitting sensor and a light detecting sensor disposed on opposing sides of said retractable tray and connected electronically to said system controller for determining the presence of a hub on the optical disk;

wherein said system controller is further configured to measure a time period corresponding to movement of the optical disk in said retractable tray as the optical disk undergoes movement with respect to the housing, and said system controller determining the presence of a hub in response to a length of said time period.

* * * * *